US011909471B2

(12) United States Patent
Sadiq et al.

(10) Patent No.: US 11,909,471 B2
(45) Date of Patent: Feb. 20, 2024

(54) TECHNIQUES FOR GROUPING AND REPORTING ANTENNA SUBSELECTIONS FOR MULTIPLE-INPUT MULTIPLE-OUTPUT MULTIPLEXING

(71) Applicant: QUALCOMM Incorporated, San Diego, CA (US)

(72) Inventors: Bilal Sadiq, Basking Ridge, NJ (US); Juergen Cezanne, Ocean Township, NJ (US); Danlu Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 106 days.

(21) Appl. No.: 17/545,695

(22) Filed: Dec. 8, 2021

(65) Prior Publication Data

US 2023/0179270 A1    Jun. 8, 2023

(51) Int. Cl.
*H04B 7/02* (2018.01)
*H04B 7/0456* (2017.01)
*H04W 24/08* (2009.01)

(52) U.S. Cl.
CPC .......... *H04B 7/0456* (2013.01); *H04W 24/08* (2013.01)

(58) Field of Classification Search
CPC .............................. H04B 7/0456; H04W 24/08
USPC ........................................................ 375/267
See application file for complete search history.

(56) References Cited

U.S. PATENT DOCUMENTS

| 9,071,299 | B1* | 6/2015 | Schelstraete | H04B 7/0452 |
| 10,027,395 | B2* | 7/2018 | Park | H04B 7/0478 |
| 2009/0122884 | A1* | 5/2009 | Vook | H04L 5/0053 |
| | | | | 375/260 |
| 2018/0152227 | A1* | 5/2018 | Frank | H04B 7/0456 |
| 2018/0152228 | A1* | 5/2018 | Frank | H04B 7/0456 |
| 2021/0234598 | A1 | 7/2021 | Raghavan et al. | |

OTHER PUBLICATIONS

International Search Report and Written Opinion—PCT/US2022/079823—ISA/EPO—dated Feb. 10, 2023.

(Continued)

*Primary Examiner* — Helene E Tayong
(74) *Attorney, Agent, or Firm* — Dalei Dong; Holland & Hart LLP

(57) ABSTRACT

Methods, systems, and devices for wireless communications are described for antenna selection and reporting for multiple-input multiple-output (MIMO) communications. One or more grouping parameters may be provided to a wireless node, which may indicate a subset of antennas that are to be used for MIMO communications, may indicate one or more target nodes for MIMO communications, or combinations thereof. The wireless node may measure one or more channel parameters based on the grouping parameters and determine one or more antenna subsets or target nodes that meet MIMO communication parameters (e.g., an antenna group or target node that will support a certain rank of MIMO communications). The wireless node may report an indication of the identified antenna subsets or target nodes to a control entity for scheduling of MIMO communications.

30 Claims, 21 Drawing Sheets

(56) References Cited

OTHER PUBLICATIONS

Li Z., et al., "Adaptive Transmit Antenna Selection Based on PCA for Millimeter Wave LOS MIMO Channel", IEEE Access, vol. 7, Jan. 14, 2019, pp. 12087-12096, XP011707746, DOI: 10 . 1109/ACCESS.2019.2892869, Abstract Section III.C, figures 1, 3.

ZTE: "Enhancements on Beam Management for Multi-TRP", 3GPP TSG RAN WG1 Meeting #102-e, R1-2005457, 3rd Generation Partnership Project (3GPP), Mobile Competence Centre, 650, Route Des Lucioles, F-06921 Sophia-Antipolis Cedex, France, vol. RAN WG1, No. e-Meeting, Aug. 17, 2020-Aug. 28, 2020, Aug. 8, 2020, 11 Pages, XP051917481, Sections 2.1, 2.2, 3, 3.1 and 3.2, p. 1-p. 7, Figures 1, 2, 3.

\* cited by examiner

Antenna Grouping
Configuration 1
405-a

Antenna Grouping
Configuration 2
405-b

TECHNIQUES FOR GROUPING AND REPORTING ANTENNA SUBSELECTIONS FOR MULTIPLE-INPUT MULTIPLE-OUTPUT MULTIPLEXING

FIELD OF TECHNOLOGY

The following relates to wireless communications, including techniques for grouping and reporting antenna subselections for multiple-input multiple-output multiplexing.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

Some wireless devices, such as UEs and base stations, may be equipped with a number of transmit and receive antennas, and may be configured to perform wireless communications with multiple antennas. In some cases, multiple-input multiple-output (MIMO) communications using multiple different antennas or antenna panels may be used for uplink and downlink transmissions, may help improve a data rates of the uplink and downlink transmissions. In many devices, a larger number of antennas may be provided that are switched to a lower number of radio frequency (RF) component chains (e.g., digital/analog converters, power amplifiers, mixers, and the like), which may allow for flexibility in antenna selection with reduced hardware cost and complexity of RF chains. Efficient techniques for selecting and switching RF chains and antennas may help to enhance communications and device operation in wireless networks.

SUMMARY

The described techniques relate to improved methods, systems, devices, and apparatuses that support techniques for grouping and reporting antenna subselections for multiple-input multiple-output (MIMO) multiplexing. In various aspects, the described techniques provide for grouping of wireless nodes that meet one or more MIMO communication parameters for a given antenna subset, grouping antennas subsets for a given node or set of nodes that meet one or more MIMO communication parameters, or combinations thereof. In some cases, the wireless nodes or antenna subsets may be determined based on antenna spacings and available combinations of antennas. A user equipment (UE), or other wireless node, may measure one or more parameters for one or more subsets of antennas, or for one or more wireless nodes, and identify which measurements meet the MIMO communication parameters. The UE may report an indication of one or more subsets of antenna elements or one or more wireless nodes that meet the MIMO communication parameters.

A method for wireless communication at a first wireless node is described. The method may include receiving, from a control entity, an antenna grouping parameter, identifying, based on the antenna grouping parameter, at least a first subset of a set of antenna elements that meet one or more multiple-input multiple-output (MIMO) communication parameters for one or more target wireless nodes, or at least one target wireless node that meets the one or more MIMO communication parameters for at least a second subset of antenna elements, and transmitting to the control entity, responsive to receiving the antenna grouping parameter, an indication of at least the first subset of antenna elements or the at least one target wireless node.

An apparatus for wireless communication at a first wireless node is described. The apparatus may include a processor, memory coupled with the processor, and instructions stored in the memory. The instructions may be executable by the processor to cause the apparatus to receive, from a control entity, an antenna grouping parameter, identify, based on the antenna grouping parameter, at least a first subset of a set of antenna elements that meet one or more multiple-input multiple-output (MIMO) communication parameters for one or more target wireless nodes, or at least one target wireless node that meets the one or more MIMO communication parameters for at least a second subset of antenna elements, and transmit to the control entity, responsive to receiving the antenna grouping parameter, an indication of at least the first subset of antenna elements or the at least one target wireless node.

Another apparatus for wireless communication at a first wireless node is described. The apparatus may include means for receiving, from a control entity, an antenna grouping parameter, means for identifying, based on the antenna grouping parameter, at least a first subset of a set of antenna elements that meet one or more multiple-input multiple-output (MIMO) communication parameters for one or more target wireless nodes, or at least one target wireless node that meets the one or more MIMO communication parameters for at least a second subset of antenna elements, and means for transmitting to the control entity, responsive to receiving the antenna grouping parameter, an indication of at least the first subset of antenna elements or the at least one target wireless node.

A non-transitory computer-readable medium storing code for wireless communication at a first wireless node is described. The code may include instructions executable by a processor to receive, from a control entity, an antenna grouping parameter, identify, based on the antenna grouping parameter, at least a first subset of a set of antenna elements that meet one or more multiple-input multiple-output (MIMO) communication parameters for one or more target wireless nodes, or at least one target wireless node that meets the one or more MIMO communication parameters for at least a second subset of antenna elements, and transmit to the control entity, responsive to receiving the antenna grouping parameter, an indication of at least the first subset of antenna elements or the at least one target wireless node.

Some examples of the method, apparatuses, and non-transitory computer-readable medium described herein may further include operations, features, means, or instructions for determining, for each of two or more subsets of antenna elements, two or more singular values of a singular value decomposition of a channel matrix and determining that at least the first subset of antenna elements have a first quantity of singular values that are within a first range of a largest valued singular value, where the one or more MIMO communication parameters include at least one of the first quantity of singular values or the first range. Some examples of the method, apparatuses, and non-transitory computer-readable medium described herein may further include operations, features, means, or instructions for determining a number of subsets of antenna elements that meet the one or more MIMO communication parameters for each of two or more target nodes, and where the identification of at least the first subset of antenna elements includes each subset of antenna elements that meet the one or more MIMO communication parameter for each of the two or more target nodes.

Some examples of the method, apparatuses, and non-transitory computer-readable medium described herein may further include operations, features, means, or instructions for communicating with the one or more target nodes using at least the first subset of antenna elements. In some examples of the method, apparatuses, and non-transitory computer-readable medium described herein, each antenna element of the set of antenna elements is connectable to one or more radio chains, and at least the first subset of antenna elements are determined based on different combinations of antenna elements that are concurrently usable with different radio chains.

In some examples of the method, apparatuses, and non-transitory computer-readable medium described herein, at least the first subset of antenna elements are further determined based on a non-uniform spacing between different antenna elements of the set of antenna elements. In some examples of the method, apparatuses, and non-transitory computer-readable medium described herein, the set of antenna elements includes individual antenna elements that are arranged with a uniform spacing, and the non-uniform spacing between different antenna elements may be achieved through selectively enabling antenna elements such that adjacent antenna elements of consecutive pairs of antenna elements in at least the first subset of antenna elements have different spacings. In some examples of the method, apparatuses, and non-transitory computer-readable medium described herein, at least the first subset of antenna elements meets the one or more MIMO communication parameters for two or more target nodes that are located at different distances from the first wireless node.

Some examples of the method, apparatuses, and non-transitory computer-readable medium described herein may further include operations, features, means, or instructions for measuring one or more reference signal transmissions from each of two or more target nodes and determining that at least the first subset of antenna elements meet the one or more MIMO communication parameters based on the measuring. Some examples of the method, apparatuses, and non-transitory computer-readable medium described herein may further include operations, features, means, or instructions for identifying a set of target nodes that meet the one or more MIMO communication parameters for at least the second subset of antenna elements and transmitting an identification of the set of target nodes to the control entity. In some examples of the method, apparatuses, and non-transitory computer-readable medium described herein, the antenna grouping parameter includes a set of target nodes associated with the one or more MIMO communication parameters, and the identification of at least the first subset of antenna elements may be based on the one or more MIMO communication parameters being met for each target node of the set of target nodes. In some examples of the method, apparatuses, and non-transitory computer-readable medium described herein, the one or more MIMO communication parameters may be applied for single-user MIMO or multi-user MIMO.

Some examples of the method, apparatuses, and non-transitory computer-readable medium described herein may further include operations, features, means, or instructions for communicating with one or more target nodes using two or more subsets of antennas to transmit a same data transmission to achieve uniform coverage of the same data transmission.

A method for wireless communication at a control entity is described. The method may include transmitting, to at least a first node, an antenna grouping parameter for identification of at least a first subset of a set of antenna elements that meet one or more multiple-input multiple-output (MIMO) communication parameters for MIMO communications between the first node and one or more target nodes, or at least one target wireless node that meets the one or more MIMO communication parameters for at least a second subset of antenna elements and receiving, from the first node, an identification of at least the first subset of antenna elements or the at least one target node.

An apparatus for wireless communication at a control entity is described. The apparatus may include a processor, memory coupled with the processor, and instructions stored in the memory. The instructions may be executable by the processor to cause the apparatus to transmit, to at least a first node, an antenna grouping parameter for identification of at least a first subset of a set of antenna elements that meet one or more multiple-input multiple-output (MIMO) communication parameters for MIMO communications between the first node and one or more target nodes, or at least one target wireless node that meets the one or more MIMO communication parameters for at least a second subset of antenna elements and receive, from the first node, an identification of at least the first subset of antenna elements or the at least one target node.

Another apparatus for wireless communication at a control entity is described. The apparatus may include means for transmitting, to at least a first node, an antenna grouping parameter for identification of at least a first subset of a set of antenna elements that meet one or more multiple-input multiple-output (MIMO) communication parameters for MIMO communications between the first node and one or more target nodes, or at least one target wireless node that meets the one or more MIMO communication parameters for at least a second subset of antenna elements and means for receiving, from the first node, an identification of at least the first subset of antenna elements or the at least one target node.

A non-transitory computer-readable medium storing code for wireless communication at a control entity is described. The code may include instructions executable by a processor to transmit, to at least a first node, an antenna grouping parameter for identification of at least a first subset of a set of antenna elements that meet one or more multiple-input multiple-output (MIMO) communication parameters for MIMO communications between the first node and one or more target nodes, or at least one target wireless node that meets the one or more MIMO communication parameters for at least a second subset of antenna elements and receive, from the first node, an identification of at least the first subset of antenna elements or the at least one target node.

In some examples of the method, apparatuses, and non-transitory computer-readable medium described herein, the one or more MIMO communication parameters include at least one of a first quantity of singular values of a singular value decomposition of a channel matrix that are within a first range of a largest valued singular value or a value of the first range. Some examples of the method, apparatuses, and non-transitory computer-readable medium described herein may further include operations, features, means, or instructions for receiving, from the first node, an indication of at least the first subset of antenna elements that meets the one or more MIMO communication parameter for each of two or more target nodes. In some examples of the method, apparatuses, and non-transitory computer-readable medium described herein, at least the first subset of antenna elements meet the one or more MIMO communication parameters for two or more target nodes that are located at different distances from the first node.

Some examples of the method, apparatuses, and non-transitory computer-readable medium described herein may further include operations, features, means, or instructions for receiving, from the first node, an indication of a set of target nodes that meet the one or more MIMO communication parameters for the at least the second subset of antenna elements. In some examples of the method, apparatuses, and non-transitory computer-readable medium described herein, the antenna grouping parameter further includes a set of target nodes associated with the one or more MIMO communication parameters, and the identification of at least the first subset of antenna elements is based on the one or more MIMO communication parameters being met for each target node of the set of target nodes. In some examples of the method, apparatuses, and non-transitory computer-readable medium described herein, the one or more MIMO communication parameters may be applied for single-user MIMO or multi-user MIMO.

Some examples of the method, apparatuses, and non-transitory computer-readable medium described herein may further include operations, features, means, or instructions for scheduling the first node and the one or more target nodes to use two or more subsets of antennas to transmit a same data transmission to achieve uniform coverage of the same data transmission.

DETAILED DESCRIPTION

Figure 1:
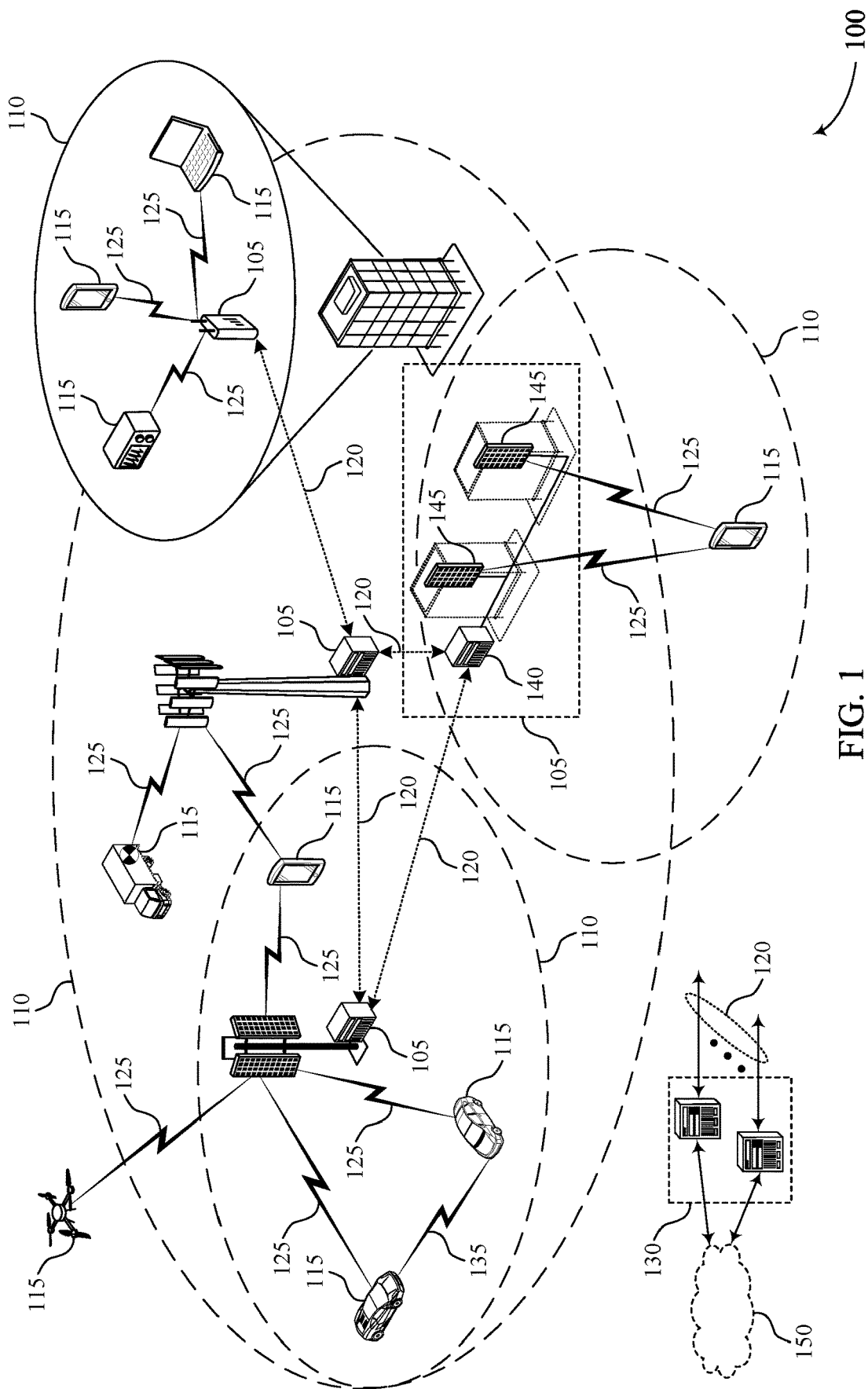
FIG. 1 illustrates an example of a wireless communications system that supports techniques for grouping and reporting antenna subselections for multiple-input multiple-output (MIMO) multiplexing in accordance with aspects of the present disclosure.

In some cases, a user equipment (UE) may be equipped with a number of antennas, and may be configured to perform wireless communications to transmit and receive signals with multiple antennas. As used in the present disclosure, antennas, or antenna elements, may refer to transmit/receive components that include individual conductors that are separately connectable to radio frequency (RF) components in a RF chain (e.g., power amplifiers (PAs), mixers, digital-to-analog converters (DACs), analog-to-digital converters (ADCs), parallel-to-serial (P/S converters, serial-to-parallel (S/P) converters, etc.), or panels that contain multiple individual conductors (e.g., arranged or coupled with phase shifter elements to operate with a desired radiation pattern). In some cases, performing uplink transmissions with higher quantities of transmit antennas, or with certain selected antennas from multiple available antennas, may help improve a reliability of the uplink transmissions. Conversely, receiving downlink transmissions with higher quantities of receive antennas, or with certain selected antennas from multiple available antennas, may help improve a reliability of the downlink transmissions.

In some cases, to enable line-of-sight (LOS) multiple-input multiple-output (MIMO) communications (as opposed to beamforming), wireless network nodes may employ multiple antennas spanning a large enough space to provide multiple spatial streams between the transmitting node and receiving node. The multiple spatial streams result from the phase difference between two transmit antennas as seen at the receiving node, due to the difference in propagation delays from the two transmit antennas. For example, certain antenna spacings, coupled with a distance between the transmitting node and receiving node, can provide multiple singular values in a singular value decomposition (SVD) vector that have similar values (e.g., within −3 dB of a largest singular value). In many devices, such as UEs, there may be fewer RF chains than antennas (e.g., to reduce cost and complexity). Thus, at such devices, different combinations or subsets of antennas may be available for LOS MIMO. Various aspects of the present disclosure provide techniques for selecting and signaling particular subsets of antennas that work at a first node for communications with one or more other nodes, or a set of one or more other nodes that work for communications with a particular subset of antennas of the first node. Such techniques allow both the transmitting node and the receiving node to use a corresponding antenna configuration in order to support the multiple spatial streams for LOS MIMO.

In various aspects, techniques discussed herein provide for a first node or first device to receive an antenna grouping parameter and identify a group of nodes or a group of antennas that that meet one or more MIMO criteria based on the antenna grouping parameter. For example, a first wireless node may receive an antenna grouping parameter that indicates a particular subset of antennas of the first wireless node are to be used for MIMO communications with one or more other nodes. The first wireless node may identify particular nodes of the one or more other nodes that have MIMO characteristics that meet a defined criteria, and may transmit an indication of the identified nodes to a control entity (e.g., a network node such as a central unit (CU)), which may schedule communications based on the identified nodes that support MIMO communications. In another example, the first wireless node may receive an antenna grouping parameter that indicates a particular set of other nodes that are candidates for MIMO communications with the first wireless node. The first wireless node may identify one or more groups of subsets of antennas of the first wireless node that have MIMO characteristics that meet a defined criteria, and may transmit an indication of the identified groups or subsets of antennas to the control entity (e.g., a CU), which may schedule communications based on the identified groups of subsets of antennas that support MIMO communications.

In some cases, the antenna grouping parameter may include MIMO communication parameters that are provided by the control entity (e.g., n number of singular values within X dB of largest singular value, where the value of n and X are signaled from the control entity). The first wireless node may then report the antenna groups/subsets based on the antenna grouping parameter that meet the MIMO communication parameters. Additionally or alternatively, the first wireless node may report to the control entity a group of target nodes with which it can communicate with the same one antenna subset while satisfying the grouping criteria. Similarly, a target node or group of target nodes may be provided by the control entity, and the first wireless node may report antenna subselections that satisfy the grouping criteria.

Aspects of the disclosure are initially described in the context of wireless communications systems. Additional aspects of the disclosure are described in the context of example antenna grouping configurations and architectures, and an example process flow. Aspects of the disclosure are further illustrated by and described with reference to apparatus diagrams, system diagrams, and flowcharts that relate to techniques for grouping and reporting antenna subselections for MIMO multiplexing.

FIG. 1 illustrates an example of a wireless communications system 100 that supports techniques for grouping and reporting antenna subselections for MIMO multiplexing in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

In some examples, one or more components of the wireless communications system 100 may operate as or be referred to as a network node. As used herein, a network node may refer to any UE 115, base station 105, entity of a core network 130, apparatus, device, or computing system configured to perform any techniques described herein. For example, a network node may be a UE 115. As another example, a network node may be a base station 105. As another example, a first network node may be configured to communicate with a second network node or a third network node. In one aspect of this example, the first network node may be a UE 115, the second network node may be a base station 105, and the third network node may be a UE 115. In another aspect of this example, the first network node may be a UE 115, the second network node may be a base station 105, and the third network node may be a base station 105. In yet other aspects of this example, the first, second, and third network nodes may be different. Similarly, reference to a UE 115, a base station 105, an apparatus, a device, or a computing system may include disclosure of the UE 115, base station 105, apparatus, device, or computing system being a network node. For example, disclosure that a UE 115 is configured to receive information from a base station 105 also discloses that a first network node is configured to receive information from a second network node. In this example, consistent with this disclosure, the first network node may refer to a first UE 115, a first base station 105, a first apparatus, a first device, or a first computing system configured to receive the information; and the second network node may refer to a second UE 115, a second base station 105, a second apparatus, a second device, or a second computing system.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/$ ($\Delta f_{max} \cdot N_f$) seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, MIMO communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

In some cases, one or more UEs 115 or base stations 105 (or other wireless nodes) may use multiple antennas for LOS MIMO communications, and may provide for grouping of wireless nodes that meet one or more MIMO communication parameters for a given antenna subset, grouping antennas subsets for a given node or set of nodes that meet one or more MIMO communication parameters, or combinations thereof. In some cases, a UE 115, or other wireless node, may measure one or more parameters for one or more subsets of antennas, or for one or more wireless nodes, and identify which measurements meet the MIMO communication parameters. The UE 115 may report an indication of one or more subsets of antenna elements, one or more wireless nodes, or both, that meet the MIMO communication parameters.

Figure 2:
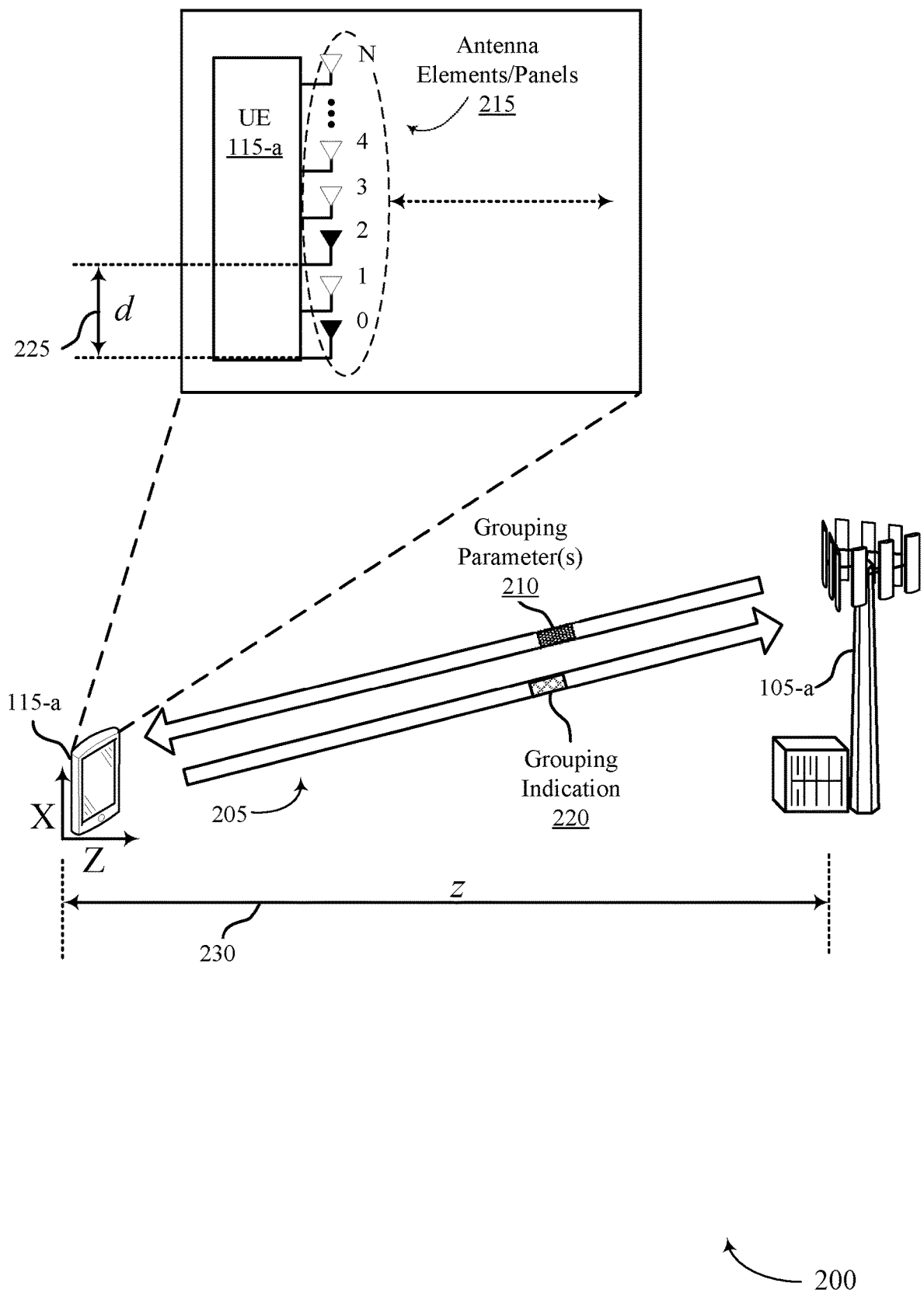
FIG. 2 illustrates an example of a wireless communications system that supports techniques for grouping and reporting antenna subselections for MIMO multiplexing in accordance with aspects of the present disclosure.

FIG. 2 illustrates an example of a wireless communications system 200 that supports techniques for grouping and reporting antenna subselections for MIMO multiplexing in accordance with aspects of the present disclosure. In some examples, wireless communications system 200 may implement, or be implemented by, aspects of wireless communications system 100. For example, wireless communications system 200 may support techniques for grouping and reporting antenna subselections for MIMO multiplexing, as described in FIG. 1.

The wireless communications system 200 may include a base station 105-*a* and a UE 115-*a*, which may be examples base stations 105 and UEs 115 as described with reference to FIG. 1. The UE 115-*a* may communicate with the base station 105-*a* using a communication link 205, which may be an example of an NR or LTE link between the UE 115-*a* and the base station 105-*a*. In some cases, the communication link 205 between the UE 115-*a* and the base station 105-*a* may include an example of an access link (e.g., Uu link) which may include a bi-directional link that enables both uplink and downlink communication. For example, the UE 115-*a* may transmit uplink signals, such as uplink control signals or uplink data signals (e.g., physical uplink shared channel (PUSCH) transmissions), to the base station 105-*a* using the communication link 205 and the base station 105-*a* may transmit downlink signals, such as downlink control signals or downlink data signals, to the UE 115-*a* using the communication link 205.

As noted previously herein, some wireless nodes (e.g., UE 115-*a*) may be equipped with a number of antennas, and may be configured to perform MIMO wireless communications with multiple antennas. For example, as shown in FIG. 2, the UE 115-*a* may include a set of antennas 215 (e.g., multiple different antenna elements or panels that are available for transmitting and receiving wireless signals). In some cases, performing transmissions with higher quantities of antennas may help improve a reliability and data throughput of the transmissions, particularly for MIMO operation. In order to enable the network (e.g., base station 105-*a* or other scheduling node such as a CU) to schedule communications such as LOS MIMO communications, the base station 105-*a* may transmit one or more grouping parameters 210 to the UE 115-*a*. The UE 115-*a* may identify antenna groupings that meet the grouping parameters, may identify one or more wireless nodes that meet the grouping parameters, or combinations thereof, and transmit an grouping indication 220 to the base station 105-*a*. Based on the antenna grouping indication, MIMO communication may be scheduled at the UE 115-*a* and the base station 105-*a*.

Wireless nodes (e.g., UE 115-*a*, base station 105-*a*) that use LOS MIMO may employ multiple antennas (e.g., antennas 215, each of which may include an individual antenna conductor/element or a panel of multiple antenna conductors/elements), where the multiple antennas span a large enough space to enable LOS MIMO (e.g., as opposed to beamforming) between such wireless nodes. The range (e.g., the set of distances between two wireless nodes) over which the wireless channel between two wireless nodes has a good rank (e.g., the number of singular values within −3 dB of the largest singular value) depends on the intra-antenna spacings of each node. Therefore, a node may have antennas placed at multiple spacings and sub-select from those antennas based on the distance to the other node in a communication pair, or distance to the multiple nodes in multipoint communication. In such a setting, the number of RF chains may be fewer than the number of antennas, and may be connected to antennas through switches. In such cases, for communication with a given node, there may be multiple antenna subselections (e.g., switch configurations to connect radio chains to antennas 215) possible that achieve a channel with a desired rank. Further, for a given antenna subselection, the communication channel with multiple wireless nodes may have good rank. In accordance with various aspects, the UE 115-*a* (or other wireless node) may provide the grouping indication 220 that indicates one or more nodes that meet the one or more grouping parameters 210 for a given antenna subselection (e.g., the grouping parameters 210 indicate a particular subset of antennas 215 that are to be used), or alternatively the grouping indication 220 may indicate one or more combinations or subsets of antennas 215 that meet the one or more grouping parameters 210 for a given node or set of nodes (e.g., the grouping parameters 210 indicate one or more nodes). The base station 105-*a* or other scheduling or resource control entity (e.g., a CU) may use the information from the grouping indication 220 to allocate a communication schedule that is commensurate with antenna subselection of the communicating nodes.

In some cases, for LOS MIMO, the different subsets of antennas may be selected from the antennas 215 such that adjacent antennas have non-uniform antenna spacing. Compared with examples where antennas are uniform with a specific inter-antenna distance, a non-uniform antenna array selection from the set of antennas 215 may provide for larger differences in propagation delays for different antennas. For example, in LOS MIMO, the phase difference between two transmit antennas as seen at a receiver due to the difference in propagation delays from the two antennas increases with increased inter-antenna spacing d 225 (sometimes approximated as proportional to d 225 for small changes in inter-antenna spacing), and decreases in transmitter-receiver separation z 230 (sometimes approximated as inversely proportional to z). For example, assuming the two transmitting antennas of the transmitting node (e.g., UE 115-a) are at (X=0, Z=0) and (X=d, Z=0), the receiving node (e.g., base station 105-a) is at (X=0, Z=z), the difference in path distance is:

$$\sqrt{z^2+x^2} - \sqrt{z^2+(x-d)^2} \approx z + \frac{x^2}{2z} - z - \frac{(x-d)^2}{2z} = \frac{2xd-d^2}{2z}.$$

In some cases, in a MIMO system (e.g., 2 transmit antennas, such as antennas 0 and 2 in the set of antennas 215, and 2 receive antennas), the phase differences between various transmit-receive antenna pairs determine the rank of the channel. Therefore, to receive the transmission from two transmit antennas with a given phase difference to support a desired rank, the farther the distance z 230 between the transmit and receive nodes, the larger the inter-antenna spacing d 225 needs to be. Thus, non-uniform spacing between antennas may could offer more choices of antenna pairs with distinct inter-antenna spacing and thus serve users at different distances with the necessary phase difference. Examples of antenna architectures are illustrated for various examples in FIGS. 3, 4, 5A, and 5B.

In some cases, the transmitting node (e.g., UE 115-a) and the receiving node (e.g., base station 105-a) may have the same available antenna placements, for communicating with each other at various distances. For three example antenna pairs at various communication distances from 100 to 10,000 multiples of wavelength, the resulting channel may have a good rank (e.g., based on a ratio of highest to lowest singular value less than 3 dB) at several different distance ranges for each different pair of antennas (e.g., different ranges of z 230 for each value of d 225 between available combinations of antennas). Thus, for some distances only one pair of antennas may provide sufficient rank for MIMO communications, and for other distances multiple pairs of antennas may provide sufficient rank for MIMO communications (e.g., for a first range of distances antenna pair 0/2 may offer suitable rank, while for a second range of distances antenna pairs 0/2 and 0/1 may offer suitable rank). Moreover, in some cases when distances z 230 are relatively small, multiple different pairs of antennas may offer suitable rank (e.g., antenna pairs 0/2, 0/1, and 1/4 may offer suitable rank). Thus, depending on relative locations of communicating nodes, outer antenna pairs (e.g., antennas 0/N) may consistently serve nodes farther away better whereas inner antenna pairs (e.g., antennas 1/2) may serve nodes close-by better (and fail to achieve good rank at larger distances).

In some cases, a first wireless node (e.g., UE 115-a) may desire to communicate with two other nodes at different distances (e.g., 2000 and 7000 multiples of wavelength respectively from itself). From the grouping indication 220, the control entity may determine which antenna subselections work both for communication with the closer node (e.g., a node at 2000 multiples of wavelength from the first wireless node), and for communication with the further away node (e.g., a node at 7000 multiples of wavelength from the first wireless node). Further, the first wireless node may need to use one subselection or combination of antennas (e.g., due to a limited number of RF chains), which may result in the control entity scheduling communications between the first wireless node and the two other nodes with the same antenna subselection. In other cases, grouping criteria may also be provided by the control entity in the grouping parameters 210 (e.g., the grouping parameters 210 may indicate that an antenna subselection is to be included in a reported group if there are at least four singular values within −3 dB of the largest singular value). For example, certain antenna spacings, coupled with a distance between the transmitting node and receiving node, can provide multiple singular values in a SVD vector that have similar values (e.g., within −3 dB of a largest singular value), and the grouping parameters may indicate a number of singular values (e.g., n singular values) that are within X dB of the largest singular value. In such cases, the first wireless node may report to the control entity a group of target nodes with which it can communicate with the same one antenna subselection while satisfying the grouping criteria, and thus support MIMO communications with a desired rank. Similarly, for a target node or group of target nodes provided by the control entity, the first wireless node may report antenna subselections that satisfy the grouping criteria.

In various aspects, the grouping may be applied in the situation of single-user MIMO (e.g., one user or one group of users at a time use a good subset of antennas); multi-user MIMO (e.g., where multiple users or groups of users are served simultaneously using different subselections of antennas); or multiple subselections of antennas can be used for the same data to achieve uniform coverage.

Figure 3:
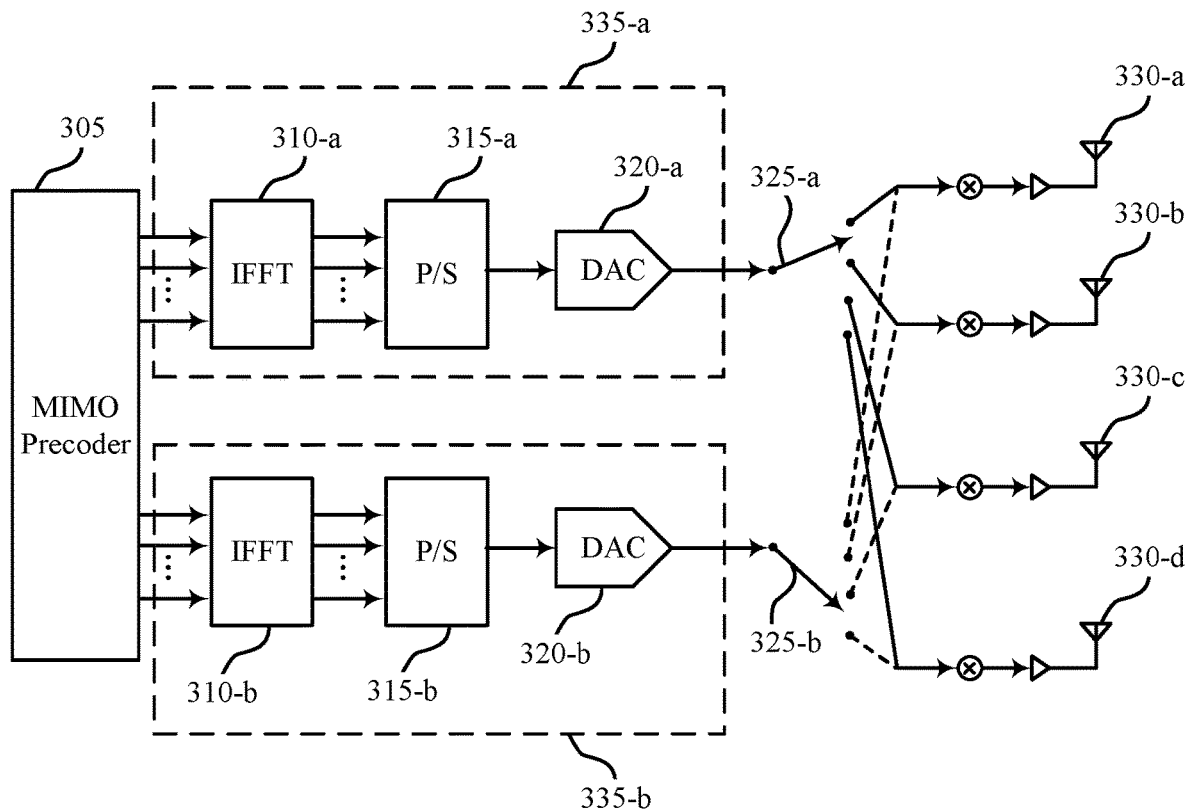
FIG. 3 illustrates an example of a RF chain and antenna architecture that supports techniques for grouping and reporting antenna subselections for MIMO multiplexing in accordance with aspects of the present disclosure.

FIG. 3 illustrates an example of a RF chain and antenna architecture 300 that supports techniques for grouping and reporting antenna subselections for MIMO multiplexing in accordance with aspects of the present disclosure. In some examples, RF chain and antenna architecture 300 may implement, or be implemented by, aspects of wireless communications system 100 or 200. For example, RF chain and antenna architecture 300 may support techniques for grouping and reporting antenna subselections for MIMO multiplexing, as described in FIGS. 1 and 2. The RF chain and antenna architecture 300 may be implemented, for example, in a wireless node that communicates using LOS MIMO communications, such as a base station or UE as discussed herein.

In this example, the wireless node may include four antennas 330 and two RF chains 335. The example of FIG. 3 is a fully connected architecture, in which a first switch 325-a can be used to connect a first RF chain 335-a with any of a first antenna 330-a, a second antenna 330-b, a third antenna 330-c, or a fourth antenna 330-d. Further, a second switch 325-b can be used to connect a second RF chain 335-b with any of the first antenna 330-a, second antenna 330-b, third antenna 330-c, or fourth antenna 330-d. The first RF chain 335-a may include RF components such as a first IFFT component 310-a, a first P/S component 315-a, and a first DAC 320-a. Likewise, the second RF chain 335-b may include RF components such as a second IFFT component 310-*b*, a second P/S component 315-*b*, and a second DAC 320-*b*. A MIMO precoder 305 may provide inputs to each RF chain 335. In some cases, the four antennas 330 may be placed at non-uniform spacing (e.g., at 0, 11.6, 38.5 and 54.2 multiples of carrier wavelength for consecutive antennas 330 relative to an first antenna). In other cases, the antennas 330 may be placed with uniform spacings, and selective enabling of different antennas 330 may be used to achieve an effective non-uniform spacing. Examples of such configurations are illustrated in FIG. 4.

Continuing with the example of FIG. 3, the fully connected architecture with two RF chains 335 and four antennas 330 may result in six possible combinations of antenna pairs. Thus, in this example, if the wireless node is provided with an antenna grouping parameter that indicates a particular combination of antennas 330, the wireless node may determine one or more other nodes that meet one or more MIMO communication parameters (e.g., one or more nodes that have at least four singular values within −3 dB of the largest singular value when using the indicated combination of antennas 330). In other examples, the wireless node may be provided with an antenna grouping parameter that indicates one or more other nodes, and the wireless node may determine one or more combinations of antennas 330 that meet one or more MIMO communication parameters for transmissions to the one or more other nodes (e.g., one or more combinations of antennas that have at least four singular values within −3 dB of the largest singular value for the indicated node(s)).

Figure 4:
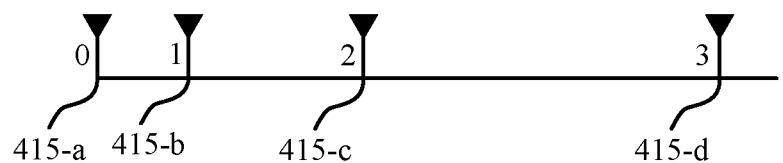
FIG. 4 illustrates an example of antenna grouping configurations that support techniques for grouping and reporting antenna subselections for MIMO multiplexing in accordance with aspects of the present disclosure.
Figure 4:
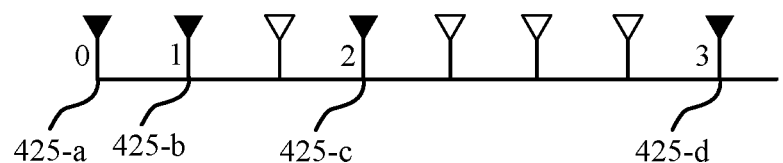

FIG. 4 illustrates examples of antenna grouping configurations 400 that support techniques for grouping and reporting antenna subselections for MIMO multiplexing in accordance with aspects of the present disclosure. In some examples, antenna grouping configurations 400 may implement, or be implemented by, aspects of wireless communications system 100 or 200. For example, antenna grouping configurations 400 may support techniques for grouping and reporting antenna subselections for MIMO multiplexing, as described in FIGS. 1 and 2. The antenna grouping configurations 400 may be implemented, for example, in a wireless node that communicates using LOS MIMO communications, such as a base station or UE as discussed herein.

In a first example configuration 405-*a*, a wireless node may include a set of antennas 410 that include a first antenna 415-*a*, a second antenna 415-*b*, a third antenna 415-*c*, and a fourth antenna 415-*d*. In this example, each antenna 415 of the set of antennas 410 may have a non-uniform spacing relative to adjacent antennas 415. For example, the first antenna 415-*a* may be located at zero multiples of a carrier wavelength and be a reference point, the second antenna 415-*b* may be located at 11.6 multiples of the carrier wavelength from the first antenna 415-*a*, the third antenna 415-*c* may be located at 38.5 multiples of the carrier wavelength from the first antenna 415-*a*, and the fourth antenna 415-*d* may be located at 54.2 multiples of the carrier wavelength from the first antenna 415-*a*. When selecting grouping for antennas, the non-uniform spacing may allow for enhanced flexibility in antenna selection that provides sufficient rank for MIMO communications.

In a second example configuration 405-*b*, the wireless node may include a set of antennas 420 that include eight antennas 425 that have a uniform spacing relative to adjacent antennas. In order to provide antenna groupings that have varying distances between antenna pairs, in this example a subset of the set of antennas 420 may be selectively enabled, such that a first antenna 425-*a*, a second antenna 425-*b*, a third antenna 425-*c*, and a fourth antenna 425-*d* are available for antenna grouping for MIMO communications, which may allow for enhanced flexibility in antenna selection that provides sufficient rank for MIMO communications. It is to be understood that the example configurations 405 illustrated in FIG. 4 are provided for purposes of illustration and discussion, and that numerous other configurations may be implemented in accordance with various techniques as discussed herein.

Figure 5A:
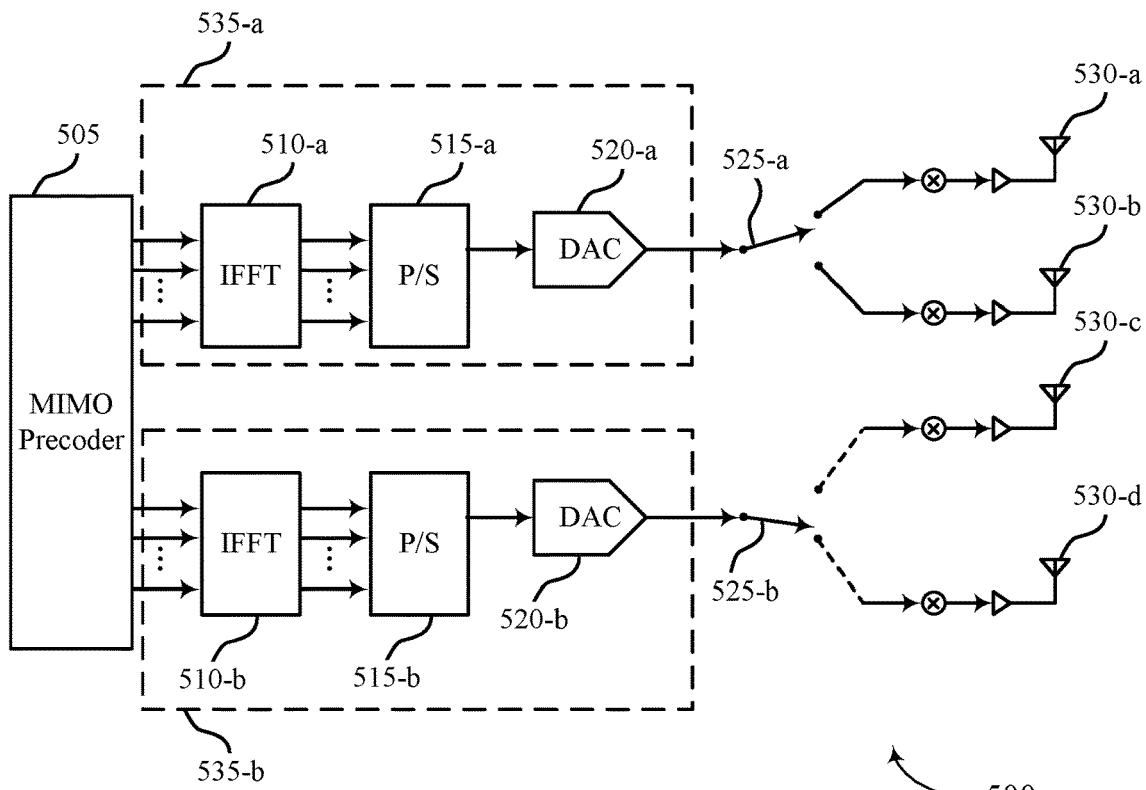
FIGS. 5A and 5B illustrate examples of RF chain and antenna architectures that support techniques for grouping and reporting antenna subselections for MIMO multiplexing in accordance with aspects of the present disclosure.
Figure 5B:
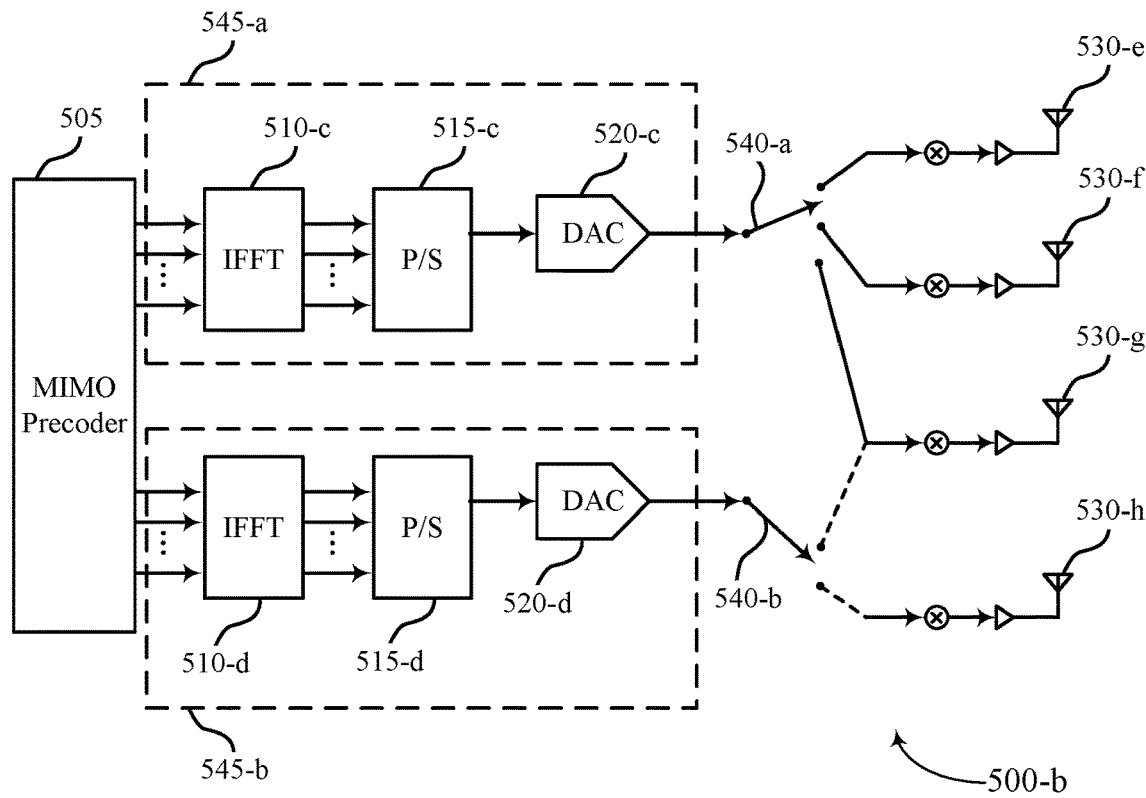

FIGS. 5A and 5B illustrate examples of RF chain and antenna architectures 500 in a partially connected architecture that support techniques for grouping and reporting antenna subselections for MIMO multiplexing in accordance with aspects of the present disclosure. In some examples, RF chain and antenna architectures 500 may implement, or be implemented by, aspects of wireless communications system 100 or 200. For example, RF chain and antenna architectures 500 may support techniques for grouping and reporting antenna subselections for MIMO multiplexing, as described in FIGS. 1 through 4. The RF chain and antenna architectures 500 may be implemented, for example, in wireless nodes that communicate using LOS MIMO communications, such as a base station or UE as discussed herein.

In the example of FIG. 5A, a first example RF chain and antenna architecture 500-*a* may include four antennas 530 and two RF chains 535. The example of FIG. 5A is a partially connected architecture, in which a first switch 525-*a* can be used to connect a first RF chain 535-*a* with a first antenna 530-*a* (antenna A) or a second antenna 530-*b* (antenna B). Further, a second switch 525-*b* can be used to connect a second RF chain 535-*b* with a third antenna 530-*c* (antenna C) or a fourth antenna 530-*d* (antenna D). The first RF chain 535-*a* may include RF components such as a first IFFT component 510-*a*, a first P/S component 515-*a*, and a first DAC 520-*a*. Likewise, the second RF chain 535-*b* may include RF components such as a second IFFT component 510-*b*, a second P/S component 515-*b*, and a second DAC 520-*b*. A MIMO precoder 505 may provide inputs to each RF chain 535. In some cases, the four antennas 530 may be placed at non-uniform spacing. In other cases, the antennas 530 may be placed with uniform spacings, and selectively enabling different antennas 530 may be used to achieve an effective non-uniform spacing.

Such a partially connected architecture may be less expensive and less complex to manufacture, and may provide four pairs of antennas 530 that can be subselected, namely, AC, AD, BC, and BD. The {A,B},{C,D} partition may be viewed as a block-wise partition; the {A,C},{B,D} partition may be viewed as an interlaced partition; the {A,D},{B,C} may be viewed as an inner-outer partition. Such views can be extended to larger antenna arrays. The block-wise partition and interlaced partition may correspond to partitioning users by the directional angles of their location with respect to the transmit antenna array. The inner-outer partition may correspond to partitioning users based on their distance to the transmit antenna array. Additionally or alternatively, the scheme can also be extended to 2-dimensional arrays, where the waveform design for a 2-dimensional array can be separated into 2 separate designs of 1-dimension each and therefore the techniques as discussed herein may be directly utilized.

In the example of FIG. 5B, a first example RF chain and antenna architecture 500-*b* may include four antennas 530 and two RF chains 545. The example of FIG. 5B is also a partially connected architecture, in which a first switch 540-*a* can be used to connect a first RF chain 545-*a* with a first antenna 530-*e* (antenna A), a second antenna 530-*f* (antenna B), a third antenna 530-*g* (antenna C). Further, a second switch 540-*b* can be used to connect a second RF chain 545-*b* with the third antenna 530-*g* or a fourth antenna 530-*h* (antenna D). The first RF chain 545-*a* may include RF components such as a first IFFT component 510-*c*, a first P/S component 515-*c*, and a first DAC 520-*c*. Likewise, the second RF chain 545-*b* may include RF components such as a second IFFT component 510-*d*, a second P/S component 515-*d*, and a second DAC 520-*d*. MIMO precoder 505 may provide inputs to each RF chain 545. In some cases, the four antennas 530 again may be placed at non-uniform spacing, or may be placed with uniform spacings and selectively enabled to achieve an effective non-uniform spacing. Such a partially connected architecture may provide additional options for antenna pairs that may support MIMO communications for different receiving nodes.

Figure 6:
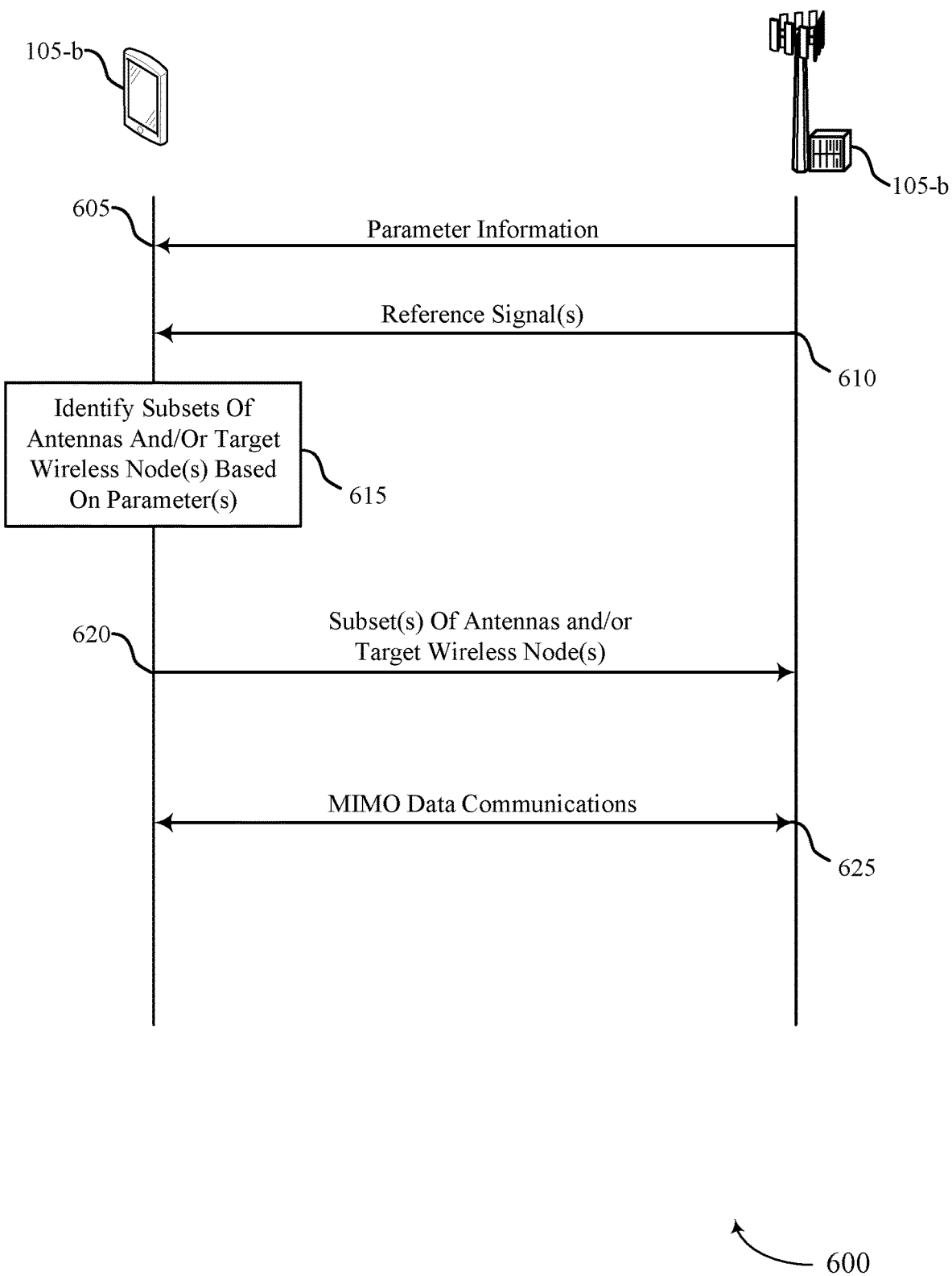
FIG. 6 illustrates an example of a process flow that supports techniques for grouping and reporting antenna subselections for MIMO multiplexing in accordance with aspects of the present disclosure.

FIG. 6 illustrates an example of a process flow 600 that supports techniques for grouping and reporting antenna subselections for MIMO multiplexing in accordance with aspects of the present disclosure. In some examples, process flow 600 may implement, or be implemented by, aspects of wireless communications systems 100 or 200, or RF chain and antenna architectures/configurations 300, 400, or 500, or any combination thereof. For example, the process flow 600 may illustrate a UE 115-*b* communicating with a base station 105-*b* in accordance with techniques as discussed herein. In some cases, process flow 600 may include a UE 115-*b* and a base station 105-*b*, which may be examples of corresponding devices as described herein. In particular, the UE 115-*b* and the base station 105-*b* illustrated in FIG. 6 may include examples of the UE 115-*a* and the base station 105-*a* illustrated in FIG. 2.

In some examples, the operations illustrated in process flow 600 may be performed by hardware (e.g., including circuitry, processing blocks, logic components, and other components), code (e.g., software) executed by a processor, or any combination thereof. Alternative examples of the following may be implemented, where some steps are performed in a different order than described or are not performed at all. In some cases, steps may include additional features not mentioned below, or further steps may be added.

At 605, the UE 115-*b* and base station 105-*b* may communicate parameter information for one or more sets of antennas at the UE 115-*b*, the base station 105-*b*, or both. In some cases, the parameter information may be received in control signaling from the base station 105-*b* (e.g., in a radio resource control (RRC) message, a medium access control (MAC) control element (CE) message, a downlink control information (DCI) message, or any combinations thereof). In some cases, the parameter information may include antenna grouping parameters that may indicate one or more of a particular subset of antennas that are to be used for MIMO communications (e.g., an index value of identification of a particular combination of antennas that are to be used), one or more target nodes for MIMO communications, or any combinations thereof. In some cases, the parameter information may include MIMO communication parameters for including a node or antenna subselection in a group (e.g., an antenna subset or combination is to be included in a reported group if there are at least n singular values within X dB of the largest singular value), or any combinations thereof.

At 610, the base station 105-*b* may transmit one or more reference signals, which may be measured at the UE 115-*b*. In some cases, the reference signals may include any type of reference signal that may be used to measure channel conditions, such as channel state information (CSI) reference signals. While reference signals are illustrated as being transmitted by base station 105-*b*, techniques as discussed herein may use reference signals transmitted by other nodes as well, such as sounding reference signals (SRSs) transmitted by a UE. In the example of FIG. 6, the reference signals may be measured at the UE 115-*b* to identify combinations of antennas (e.g., one or more subsets of antennas at the UE 115-*b* that meet the antenna grouping parameters and MIMO communication parameters).

At 615, the UE 115-*b* may identify subsets of antennas, target nodes, or both, based at least in part on the parameter information. In some cases, the UE 115-*b* may measure reference signals using different subsets of antennas to determine particular subsets of antennas that meet the indicated parameters (e.g., that meet the MIMO communication parameters for one or more target nodes). In other cases, the UE 115-*b* may receive a particular subset of antennas in the parameter information and may measure reference signals to determine which of one or more target nodes meet the MIMO communication parameters. At 620, the UE 115-*b* may transmit an indication of the identified one or more subsets of antennas, one or more target nodes, or combinations thereof, to the base station 105-*b*. In some cases the base station 105-*b* may perform scheduling based on the indication, or may provide the indication to a scheduling entity (e.g., a CU). At 625, the UE 115-*b* and base station 105-*b* may perform MIMO data communications based on the identified subset(s) of antennas or target nodes.

Figure 7:
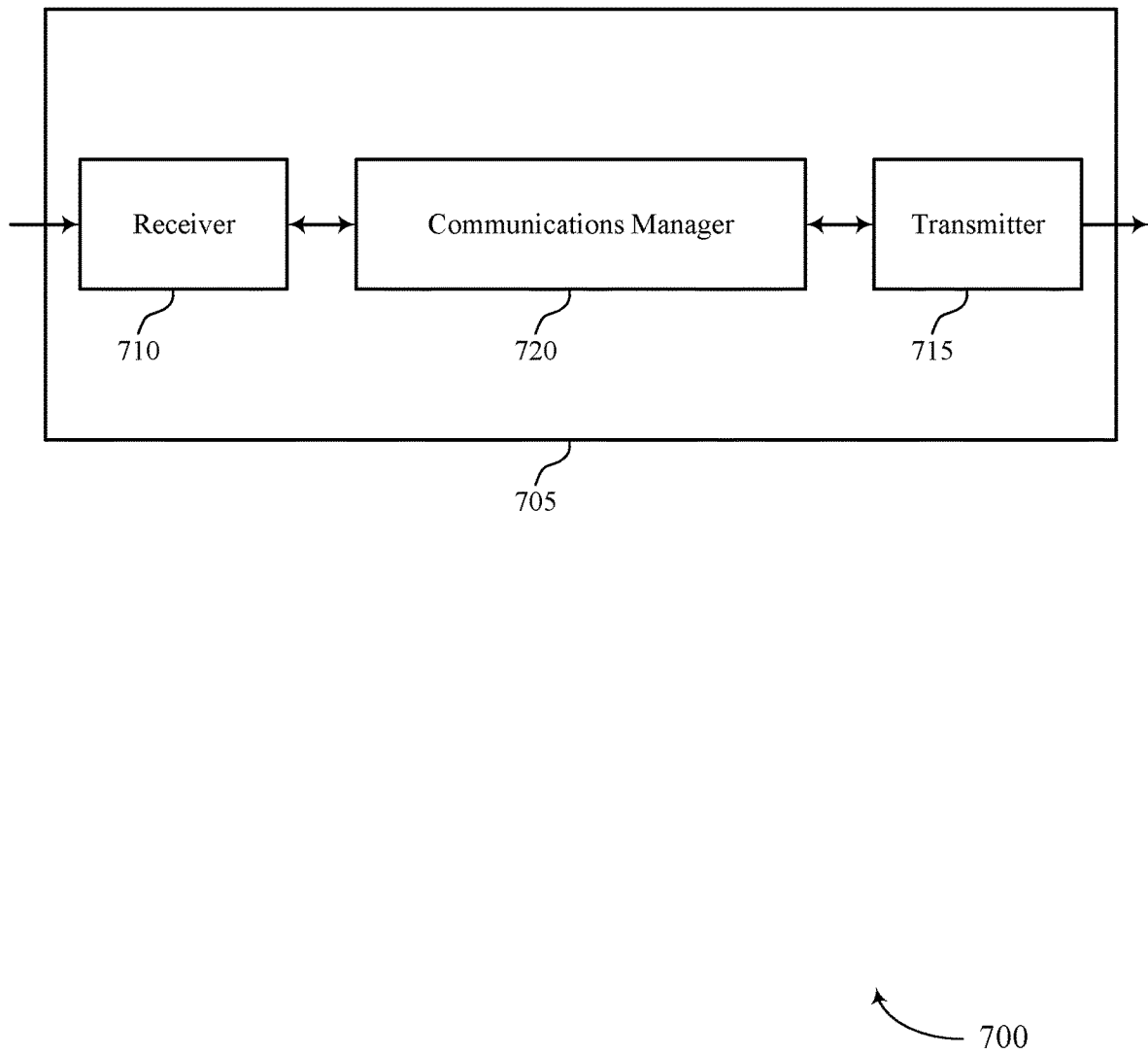
FIGS. 7 and 8 show block diagrams of devices that support techniques for grouping and reporting antenna subselections for MIMO multiplexing in accordance with aspects of the present disclosure.

FIG. 7 shows a block diagram 700 of a device 705 that supports techniques for grouping and reporting antenna subselections for MIMO multiplexing in accordance with aspects of the present disclosure. The device 705 may be an example of aspects of a UE 115 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to techniques for grouping and reporting antenna subselections for MIMO multiplexing). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to techniques for grouping and reporting antenna subselections for MIMO multiplexing). In some examples, the transmitter 715 may be co-located with a receiver 710 in a transceiver module. The transmitter 715 may utilize a single antenna or a set of multiple antennas.

The communications manager 720, the receiver 710, the transmitter 715, or various combinations thereof or various components thereof may be examples of means for performing various aspects of techniques for grouping and reporting antenna subselections for MIMO multiplexing as described herein. For example, the communications manager 720, the receiver 710, the transmitter 715, or various combinations or components thereof may support a method for performing one or more of the functions described herein.

In some examples, the communications manager 720, the receiver 710, the transmitter 715, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 720, the receiver 710, the transmitter 715, or various combinations or components thereof may be implemented in code (e.g., as communications management software or firmware) executed by a processor. If implemented in code executed by a processor, the functions of the communications manager 720, the receiver 710, the transmitter 715, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 720 may be configured to perform various operations (e.g., receiving, monitoring, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to receive information, transmit information, or perform various other operations as described herein.

The communications manager 720 may support wireless communication at a first wireless node in accordance with examples as disclosed herein. For example, the communications manager 720 may be configured as or otherwise support a means for receiving, from a control entity, an antenna grouping parameter. The communications manager 720 may be configured as or otherwise support a means for identifying, based on the antenna grouping parameter, at least a first subset of a set of antenna elements that meet one or more MIMO communication parameters for one or more target wireless nodes, or at least one target wireless node that meets the one or more MIMO communication parameters for at least a second subset of antenna elements. The communications manager 720 may be configured as or otherwise support a means for transmitting to the control entity, responsive to receiving the antenna grouping parameter, an indication of at least the first subset of antenna elements or the at least one target wireless node.

Additionally or alternatively, the communications manager 720 may support wireless communication at a control entity in accordance with examples as disclosed herein. For example, the communications manager 720 may be configured as or otherwise support a means for transmitting, to at least a first node, an antenna grouping parameter for identification of at least a first subset of a set of antenna elements that meet one or more MIMO communication parameters for MIMO communications between the first node and one or more target nodes, or at least one target wireless node that meets the one or more MIMO communication parameters for at least a second subset of antenna elements. The communications manager 720 may be configured as or otherwise support a means for receiving, from the first node, an identification of at least the first subset of antenna elements or the at least one target node.

By including or configuring the communications manager 720 in accordance with examples as described herein, the device 705 (e.g., a processor controlling or otherwise coupled to the receiver 710, the transmitter 715, the communications manager 720, or a combination thereof) may support techniques for efficient antenna selection and reporting at a wireless device. For example, implementation of antenna selection techniques at a UE may allow for LOS MIMO communications at the UE with enhanced data transfer rates. Further, efficient signaling of identified antenna groups, identified target nodes, or both, that can support MIMO communications may allow for efficient scheduling of MIMO communications. Such techniques may thus result in improvement in both uplink and downlink performance, reliability, and enhance user experience.

Figure 8:
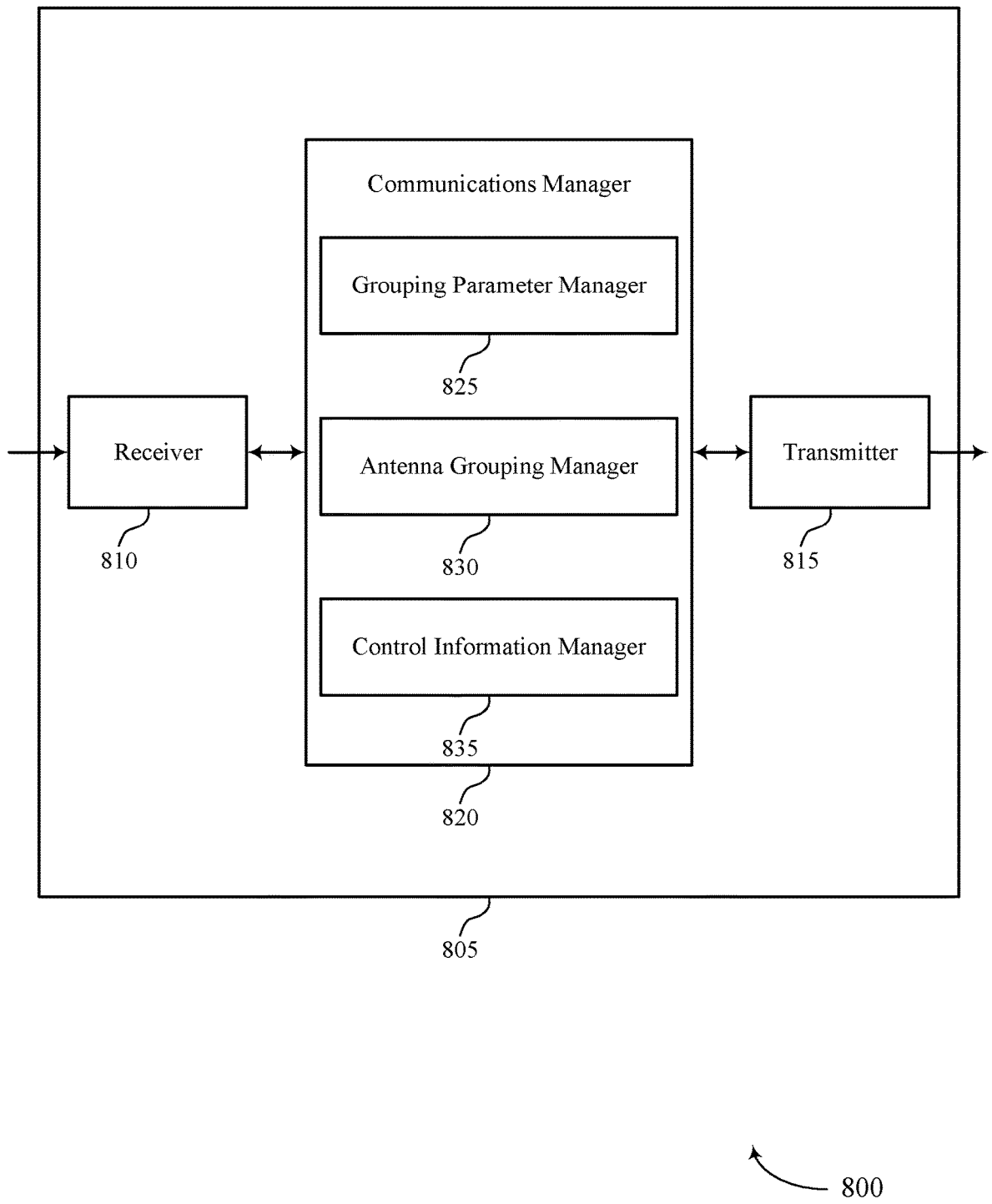

FIG. 8 shows a block diagram 800 of a device 805 that supports techniques for grouping and reporting antenna subselections for MIMO multiplexing in accordance with aspects of the present disclosure. The device 805 may be an example of aspects of a device 705 or a UE 115 as described herein. The device 805 may include a receiver 810, a transmitter 815, and a communications manager 820. The device 805 may also include a processor. Each of these components may be in communication with one another (e.g., via one or more buses).

The receiver 810 may provide a means for receiving information such as packets, user data, control information, or any combination thereof associated with various information channels (e.g., control channels, data channels, information channels related to techniques for grouping and reporting antenna subselections for MIMO multiplexing). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (e.g., control channels, data channels, information channels related to techniques for grouping and reporting antenna subselections for MIMO multiplexing). In some examples, the transmitter 815 may be co-located with a receiver 810 in a transceiver module. The transmitter 815 may utilize a single antenna or a set of multiple antennas.

The device 805, or various components thereof, may be an example of means for performing various aspects of techniques for grouping and reporting antenna subselections for MIMO multiplexing as described herein. For example, the communications manager 820 may include a grouping parameter manager 825, an antenna grouping manager 830, a control information manager 835, or any combination thereof. The communications manager 820 may be an example of aspects of a communications manager 720 as described herein. In some examples, the communications manager 820, or various components thereof, may be configured to perform various operations (e.g., receiving, monitoring, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to receive information, transmit information, or perform various other operations as described herein.

The communications manager 820 may support wireless communication at a first wireless node in accordance with examples as disclosed herein. The grouping parameter manager 825 may be configured as or otherwise support a means for receiving, from a control entity, an antenna grouping parameter. The antenna grouping manager 830 may be configured as or otherwise support a means for identifying, based on the antenna grouping parameter, at least a first subset of a set of antenna elements that meet one or more MIMO communication parameters for one or more target wireless nodes, or at least one target wireless node that meets the one or more MIMO communication parameters for at least a second subset of antenna elements. The control information manager 835 may be configured as or otherwise support a means for transmitting to the control entity, responsive to receiving the antenna grouping parameter, an indication of at least the first subset of antenna elements or the at least one target wireless node.

Additionally or alternatively, the communications manager 820 may support wireless communication at a control entity in accordance with examples as disclosed herein. The grouping parameter manager 825 may be configured as or otherwise support a means for transmitting, to at least a first node, an antenna grouping parameter for identification of at least a first subset of a set of antenna elements that meet one or more MIMO communication parameters for MIMO communications between the first node and one or more target nodes, or at least one target wireless node that meets the one or more MIMO communication parameters for at least a second subset of antenna elements. The control information manager 835 may be configured as or otherwise support a means for receiving, from the first node, an identification of at least the first subset of antenna elements or the at least one target node.

Figure 9:
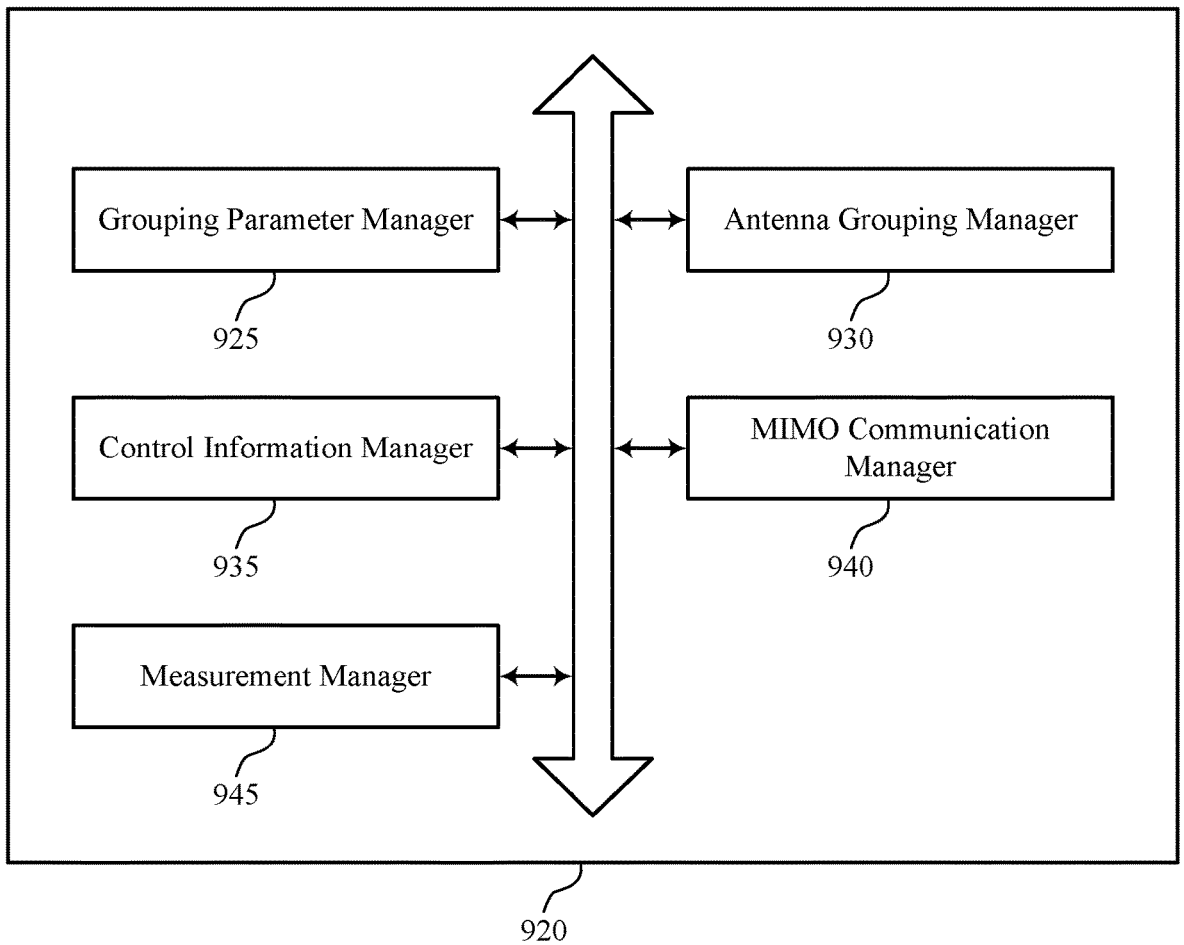
FIG. 9 shows a block diagram of a communications manager that supports techniques for grouping and reporting antenna subselections for MIMO multiplexing in accordance with aspects of the present disclosure.

FIG. 9 shows a block diagram 900 of a communications manager 920 that supports techniques for grouping and reporting antenna subselections for MIMO multiplexing in accordance with aspects of the present disclosure. The communications manager 920 may be an example of aspects of a communications manager 720, a communications manager 820, or both, as described herein. The communications manager 920, or various components thereof, may be an example of means for performing various aspects of techniques for grouping and reporting antenna subselections for MIMO multiplexing as described herein. For example, the communications manager 920 may include a grouping parameter manager 925, an antenna grouping manager 930, a control information manager 935, a MIMO communication manager 940, a measurement manager 945, or any combination thereof. Each of these components may communicate, directly or indirectly, with one another (e.g., via one or more buses).

The communications manager 920 may support wireless communication at a first wireless node in accordance with examples as disclosed herein. The grouping parameter manager 925 may be configured as or otherwise support a means for receiving, from a control entity, an antenna grouping parameter. The antenna grouping manager 930 may be configured as or otherwise support a means for identifying, based on the antenna grouping parameter, at least a first subset of a set of antenna elements that meet one or more MIMO communication parameters for one or more target wireless nodes, or at least one target wireless node that meets the one or more MIMO communication parameters for at least a second subset of antenna elements. The control information manager 935 may be configured as or otherwise support a means for transmitting to the control entity, responsive to receiving the antenna grouping parameter, an indication of at least the first subset of antenna elements or the at least one target wireless node.

In some examples, the antenna grouping manager 930 may be configured as or otherwise support a means for determining, for each of two or more subsets of antenna elements, two or more singular values of a singular value decomposition of a channel matrix. In some examples, the antenna grouping manager 930 may be configured as or otherwise support a means for determining that at least the first subset of antenna elements has a first quantity of singular values that are within a first range of a largest valued singular value, where the one or more MIMO communication parameters include at least one of the first quantity of singular values or the first range.

In some examples, the antenna grouping manager 930 may be configured as or otherwise support a means for determining a number of subsets of antenna elements that meet the one or more MIMO communication parameters for each of two or more target nodes, and where the identification of at least the first subset of antenna elements includes each subset of antenna elements that meet the one or more MIMO communication parameter for each of the two or more target nodes.

In some examples, the MIMO communication manager 940 may be configured as or otherwise support a means for communicating with the one or more target nodes using at least the first subset of antenna elements. In some examples, each antenna element of the set of antenna elements is connectable to one or more radio chains, and at least the first subset of antenna elements is determined based on different combinations of antenna elements that are concurrently usable with different radio chains. In some examples, at least the first subset of antenna elements is further determined based on a non-uniform spacing between different antenna elements of the set of antenna elements. In some examples, the set of antenna elements includes individual antenna elements that are arranged with a uniform spacing, and the non-uniform spacing between different antenna elements is achieved through selectively enabling antenna elements such that adjacent antenna elements of consecutive pairs of antenna elements in at least the first subset of antenna elements have different spacings. In some examples, at least the first subset of antenna elements meets the one or more MIMO communication parameters for two or more target nodes that are located at different distances from the first wireless node.

In some examples, the measurement manager 945 may be configured as or otherwise support a means for measuring one or more reference signal transmissions from each of two or more target nodes. In some examples, the measurement manager 945 may be configured as or otherwise support a means for determining that at least the first subset of antenna elements meet the one or more MIMO communication parameters based on the measuring.

In some examples, the grouping parameter manager 925 may be configured as or otherwise support a means for identifying a set of target nodes that meet the one or more MIMO communication parameters for at least the second subset of antenna elements. In some examples, the control information manager 935 may be configured as or otherwise support a means for transmitting an identification of the set of target nodes to the control entity.

In some examples, the antenna grouping parameter includes a set of target nodes associated with the one or more MIMO communication parameters, and the identification of at least the first subset of antenna elements is based on the one or more MIMO communication parameters being met for each target node of the set of target nodes. In some examples, the one or more MIMO communication parameters are applied for single-user MIMO or multi-user MIMO.

In some examples, the MIMO communication manager 940 may be configured as or otherwise support a means for communicating with one or more target nodes using two or more subsets of antennas to transmit a same data transmission to achieve uniform coverage of the same data transmission.

Additionally or alternatively, the communications manager 920 may support wireless communication at a control entity in accordance with examples as disclosed herein. In some examples, the grouping parameter manager 925 may be configured as or otherwise support a means for transmitting, to at least a first node, an antenna grouping parameter for identification of at least a first subset of a set of antenna elements that meet one or more MIMO communication parameters for MIMO communications between the first node and one or more target nodes, or at least one target wireless node that meets the one or more MIMO communication parameters for at least a second subset of antenna elements. In some examples, the control information manager 935 may be configured as or otherwise support a means for receiving, from the first node, an identification of at least the first subset of antenna elements or the at least one target node. In some examples, the one or more MIMO communication parameters include at least one of a first quantity of singular values of a singular value decomposition of a channel matrix that are within a first range of a largest valued singular value or a value of the first range.

In some examples, the antenna grouping manager 930 may be configured as or otherwise support a means for receiving, from the first node, an indication of at least the first subset of antenna elements that meets the one or more MIMO communication parameter for each of two or more target nodes. In some examples, at least the first subset of antenna elements meet the one or more MIMO communication parameters for two or more target nodes that are located at different distances from the first node.

In some examples, the control information manager 935 may be configured as or otherwise support a means for receiving, from the first node, an indication of a set of target nodes that meet the one or more MIMO communication parameters for the at least the second subset of antenna elements. In some examples, the antenna grouping parameter further includes a set of target nodes associated with the one or more MIMO communication parameters, and the identification of at least the first subset of antenna elements is based on the one or more MIMO communication parameters being met for each target node of the set of target nodes. In some examples, the one or more MIMO communication parameters are applied for single-user MIMO or multi-user MIMO.

In some examples, the MIMO communication manager 940 may be configured as or otherwise support a means for scheduling the first node and the one or more target nodes to use two or more subsets of antennas to transmit a same data transmission to achieve uniform coverage of the same data transmission.

Figure 10:
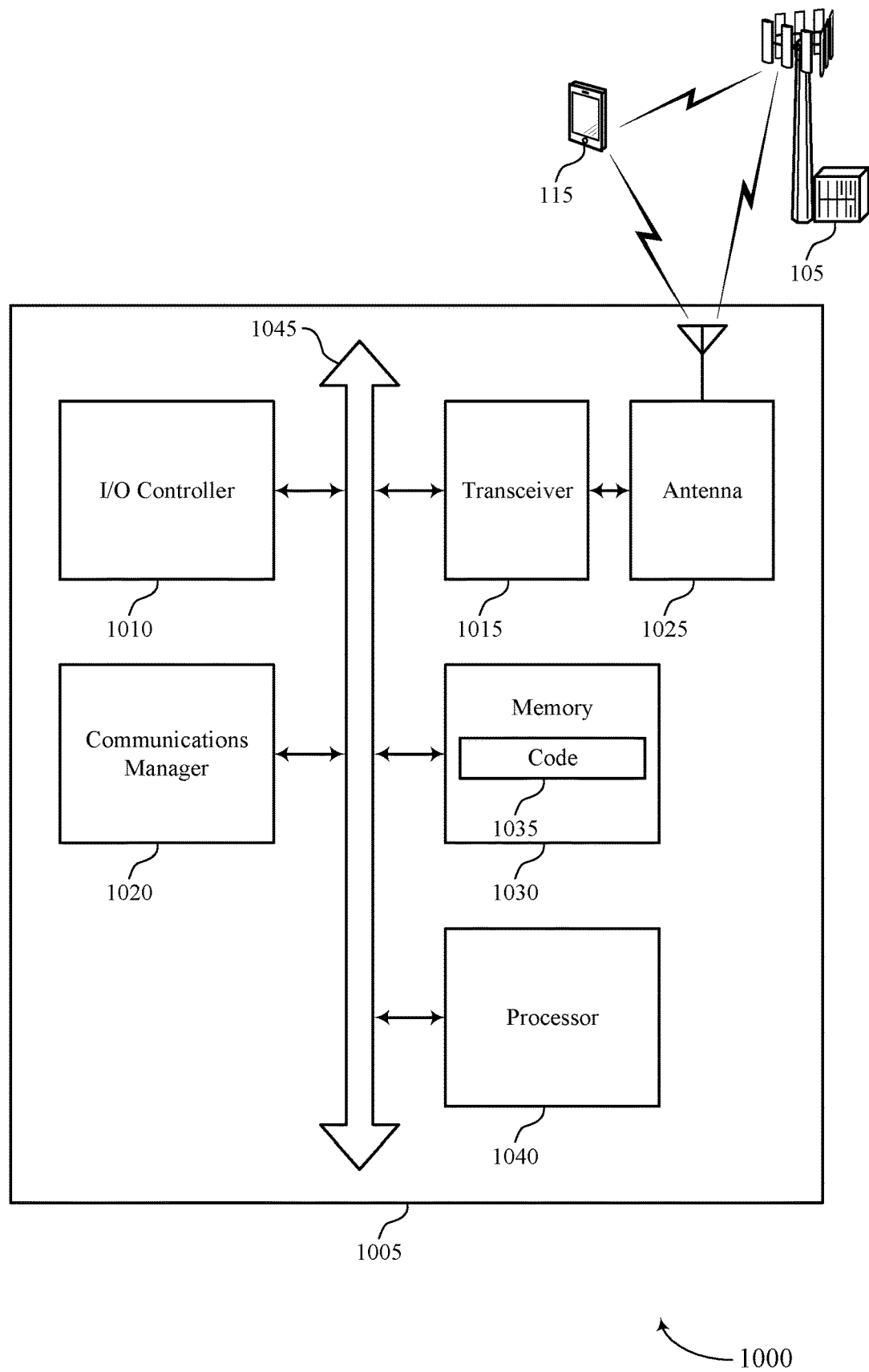
FIG. 10 shows a diagram of a system including a device that supports techniques for grouping and reporting antenna subselections for MIMO multiplexing in accordance with aspects of the present disclosure.

FIG. 10 shows a diagram of a system 1000 including a device 1005 that supports techniques for grouping and reporting antenna subselections for MIMO multiplexing in accordance with aspects of the present disclosure. The device 1005 may be an example of or include the components of a device 705, a device 805, or a UE 115 as described herein. The device 1005 may communicate wirelessly with one or more base stations 105, UEs 115, or any combination thereof. The device 1005 may include components for bi-directional voice and data communications including components for transmitting and receiving communications, such as a communications manager 1020, an input/output (I/O) controller 1010, a transceiver 1015, an antenna 1025, a memory 1030, code 1035, and a processor 1040. These components may be in electronic communication or otherwise coupled (e.g., operatively, communicatively, functionally, electronically, electrically) via one or more buses (e.g., a bus 1045).

The I/O controller 1010 may manage input and output signals for the device 1005. The I/O controller 1010 may also manage peripherals not integrated into the device 1005. In some cases, the I/O controller 1010 may represent a physical connection or port to an external peripheral. In some cases, the I/O controller 1010 may utilize an operating system such as iOS®, ANDROID®, MS-DOS®, MS-WINDOWS®, OS/2®, UNIX®, LINUX®, or another known operating system. Additionally or alternatively, the I/O controller 1010 may represent or interact with a modem, a keyboard, a mouse, a touchscreen, or a similar device. In some cases, the I/O controller 1010 may be implemented as part of a processor, such as the processor 1040. In some cases, a user may interact with the device 1005 via the I/O controller 1010 or via hardware components controlled by the I/O controller 1010.

In some cases, the device 1005 may include a single antenna 1025. However, in some other cases, the device 1005 may have more than one antenna 1025, which may be capable of concurrently transmitting or receiving multiple wireless transmissions. The transceiver 1015 may communicate bi-directionally, via the one or more antennas 1025, wired, or wireless links as described herein. For example, the transceiver 1015 may represent a wireless transceiver and may communicate bi-directionally with another wireless transceiver. The transceiver 1015 may also include a modem to modulate the packets, to provide the modulated packets to one or more antennas 1025 for transmission, and to demodulate packets received from the one or more antennas 1025. The transceiver 1015, or the transceiver 1015 and one or more antennas 1025, may be an example of a transmitter 715, a transmitter 815, a receiver 710, a receiver 810, or any combination thereof or component thereof, as described herein.

The memory 1030 may include random access memory (RAM) and read-only memory (ROM). The memory 1030 may store computer-readable, computer-executable code 1035 including instructions that, when executed by the processor 1040, cause the device 1005 to perform various functions described herein. The code 1035 may be stored in a non-transitory computer-readable medium such as system memory or another type of memory. In some cases, the code 1035 may not be directly executable by the processor 1040 but may cause a computer (e.g., when compiled and executed) to perform functions described herein. In some cases, the memory 1030 may contain, among other things, a basic I/O system (BIOS) which may control basic hardware or software operation such as the interaction with peripheral components or devices.

The processor 1040 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1040 may be configured to operate a memory array using a memory controller. In some other cases, a memory controller may be integrated into the processor 1040. The processor 1040 may be configured to execute computer-readable instructions stored in a memory (e.g., the memory 1030) to cause the device 1005 to perform various functions (e.g., functions or tasks supporting techniques for grouping and reporting antenna subselections for MIMO multiplexing). For example, the device 1005 or a component of the device 1005 may include a processor 1040 and memory 1030 coupled to the processor 1040, the processor 1040 and memory 1030 configured to perform various functions described herein.

The communications manager 1020 may support wireless communication at a first wireless node in accordance with examples as disclosed herein. For example, the communications manager 1020 may be configured as or otherwise support a means for receiving, from a control entity, an antenna grouping parameter. The communications manager 1020 may be configured as or otherwise support a means for identifying, based on the antenna grouping parameter, at least a first subset of a set of antenna elements that meet one or more MIMO communication parameters for one or more target wireless nodes, or at least one target wireless node that meets the one or more MIMO communication parameters for at least a second subset of antenna elements. The communications manager 1020 may be configured as or otherwise support a means for transmitting to the control entity, responsive to receiving the antenna grouping parameter, an indication of at least the first subset of antenna elements or the at least one target wireless node.

Additionally or alternatively, the communications manager 1020 may support wireless communication at a control entity in accordance with examples as disclosed herein. For example, the communications manager 1020 may be configured as or otherwise support a means for transmitting, to at least a first node, an antenna grouping parameter for identification of at least a first subset of a set of antenna elements that meet one or more MIMO communication parameters for MIMO communications between the first node and one or more target nodes, or at least one target wireless node that meets the one or more MIMO communication parameters for at least a second subset of antenna elements. The communications manager 1020 may be configured as or otherwise support a means for receiving, from the first node, an identification of at least the first subset of antenna elements or the at least one target node.

By including or configuring the communications manager 1020 in accordance with examples as described herein, the device 1005 may support techniques for efficient antenna selection and reporting at a wireless device. For example, implementation of antenna selection techniques at a UE may allow for LOS MIMO communications at the UE with enhanced data transfer rates. Further, efficient signaling of identified antenna groups, identified target nodes, or both, that can support MIMO communications may allow for efficient scheduling of MIMO communications. Such techniques may thus result in improvement in both uplink and downlink performance, reliability, and enhance user experience.

In some examples, the communications manager 1020 may be configured to perform various operations (e.g., receiving, monitoring, transmitting) using or otherwise in cooperation with the transceiver 1015, the one or more antennas 1025, or any combination thereof. Although the communications manager 1020 is illustrated as a separate component, in some examples, one or more functions described with reference to the communications manager 1020 may be supported by or performed by the processor 1040, the memory 1030, the code 1035, or any combination thereof. For example, the code 1035 may include instructions executable by the processor 1040 to cause the device 1005 to perform various aspects of techniques for grouping and reporting antenna subselections for MIMO multiplexing as described herein, or the processor 1040 and the memory 1030 may be otherwise configured to perform or support such operations.

Figure 11:
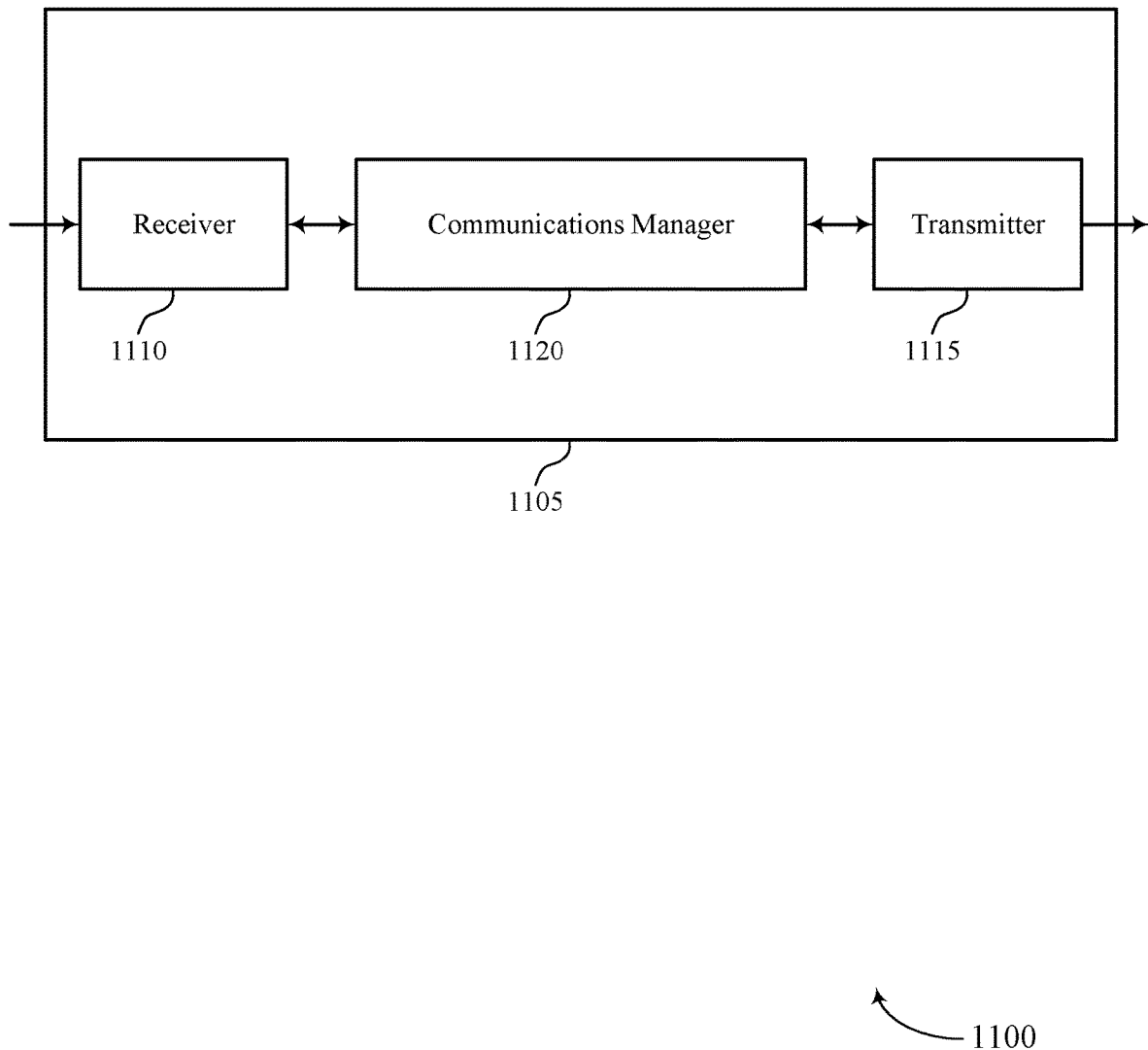
FIGS. 11 and 12 show block diagrams of devices that support techniques for grouping and reporting antenna subselections for MIMO multiplexing in accordance with aspects of the present disclosure.

FIG. 11 shows a block diagram 1100 of a device 1105 that supports techniques for grouping and reporting antenna subselections for MIMO multiplexing in accordance with aspects of the present disclosure. The device 1105 may be an example of aspects of a base station 105 as described herein. The device 1105 may include a receiver 1110, a transmitter 1115, and a communications manager 1120. The device 1105 may also include a processor. Each of these components may be in communication with one another (e.g., via one or more buses).

The receiver 1110 may provide a means for receiving information such as packets, user data, control information, or any combination thereof associated with various information channels (e.g., control channels, data channels, information channels related to techniques for grouping and reporting antenna subselections for MIMO multiplexing). Information may be passed on to other components of the device 1105. The receiver 1110 may utilize a single antenna or a set of multiple antennas.

The transmitter 1115 may provide a means for transmitting signals generated by other components of the device 1105. For example, the transmitter 1115 may transmit information such as packets, user data, control information, or any combination thereof associated with various information channels (e.g., control channels, data channels, information channels related to techniques for grouping and reporting antenna subselections for MIMO multiplexing). In some examples, the transmitter 1115 may be co-located with a receiver 1110 in a transceiver module. The transmitter 1115 may utilize a single antenna or a set of multiple antennas.

The communications manager 1120, the receiver 1110, the transmitter 1115, or various combinations thereof or various components thereof may be examples of means for performing various aspects of techniques for grouping and reporting antenna subselections for MIMO multiplexing as described herein. For example, the communications manager 1120, the receiver 1110, the transmitter 1115, or various combinations or components thereof may support a method for performing one or more of the functions described herein.

In some examples, the communications manager 1120, the receiver 1110, the transmitter 1115, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 1120, the receiver 1110, the transmitter 1115, or various combinations or components thereof may be implemented in code (e.g., as communications management software or firmware) executed by a processor. If implemented in code executed by a processor, the functions of the communications manager 1120, the receiver 1110, the transmitter 1115, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 1120 may be configured to perform various operations (e.g., receiving, monitoring, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to receive information, transmit information, or perform various other operations as described herein.

The communications manager 1120 may support wireless communication at a control entity in accordance with examples as disclosed herein. For example, the communications manager 1120 may be configured as or otherwise support a means for transmitting, to at least a first node, an antenna grouping parameter for identification of at least a first subset of a set of antenna elements that meet one or more MIMO communication parameters for MIMO communications between the first node and one or more target nodes, or at least one target wireless node that meets the one or more MIMO communication parameters for at least a second subset of antenna elements. The communications manager 1120 may be configured as or otherwise support a means for receiving, from the first node, an identification of at least the first subset of antenna elements or the at least one target node.

By including or configuring the communications manager 1120 in accordance with examples as described herein, the device 1105 (e.g., a processor controlling or otherwise coupled to the receiver 1110, the transmitter 1115, the communications manager 1120, or a combination thereof) may support techniques for efficient antenna selection and reporting at a wireless device. For example, implementation of antenna selection techniques at a wireless node may allow for LOS MIMO communications at the node with enhanced data transfer rates. Further, efficient signaling of identified antenna groups, identified target nodes, or both, that can support MIMO communications may allow for efficient scheduling of MIMO communications. Such techniques may thus result in improvement in both uplink and downlink performance, reliability, and enhance user experience.

Figure 12:
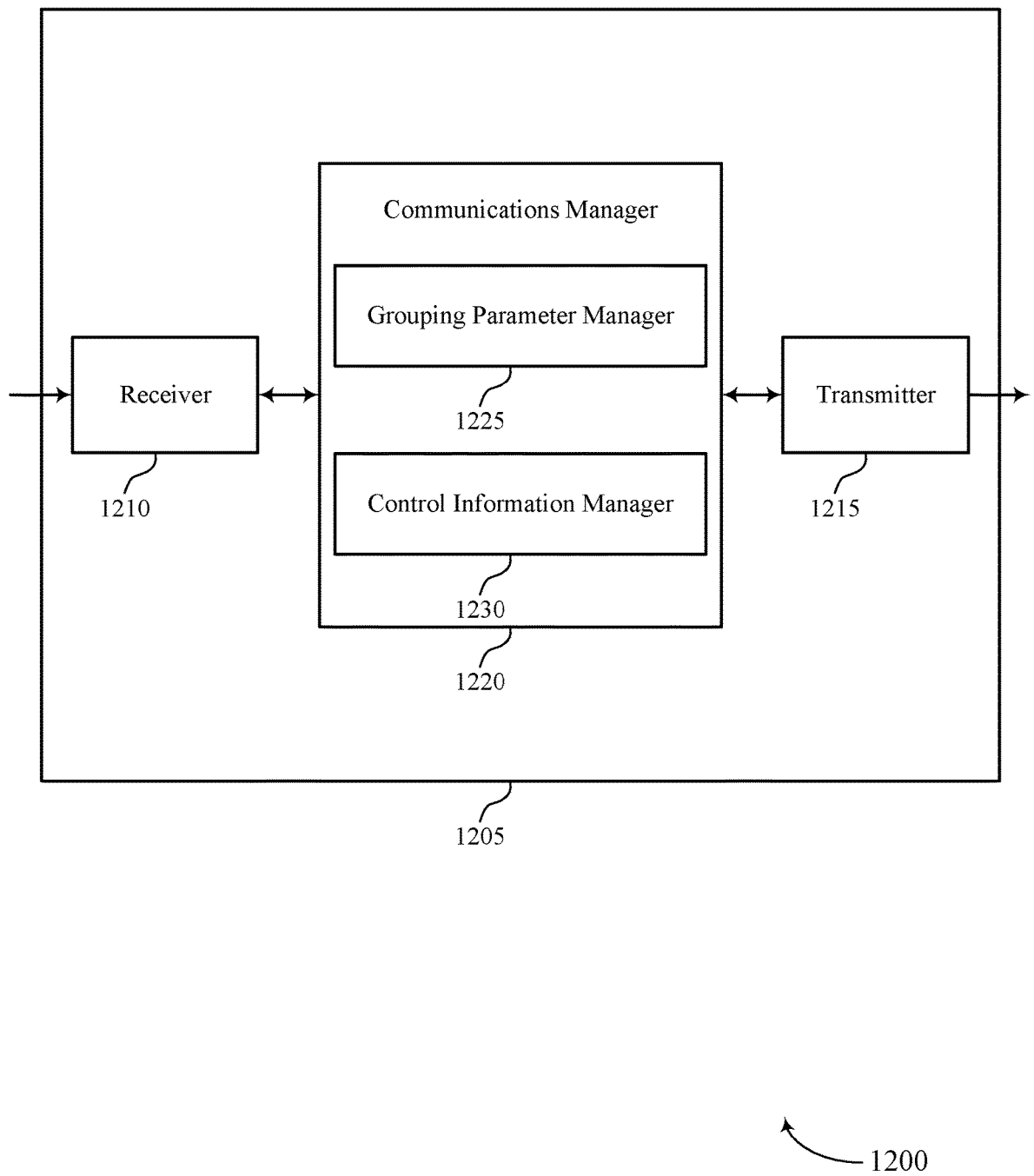

FIG. 12 shows a block diagram 1200 of a device 1205 that supports techniques for grouping and reporting antenna subselections for MIMO multiplexing in accordance with aspects of the present disclosure. The device 1205 may be an example of aspects of a device 1105 or a base station 105 as described herein. The device 1205 may include a receiver 1210, a transmitter 1215, and a communications manager 1220. The device 1205 may also include a processor. Each of these components may be in communication with one another (e.g., via one or more buses).

The receiver 1210 may provide a means for receiving information such as packets, user data, control information, or any combination thereof associated with various information channels (e.g., control channels, data channels, information channels related to techniques for grouping and reporting antenna subselections for MIMO multiplexing). Information may be passed on to other components of the device 1205. The receiver 1210 may utilize a single antenna or a set of multiple antennas.

The transmitter 1215 may provide a means for transmitting signals generated by other components of the device 1205. For example, the transmitter 1215 may transmit information such as packets, user data, control information, or any combination thereof associated with various information channels (e.g., control channels, data channels, information channels related to techniques for grouping and reporting antenna subselections for MIMO multiplexing). In some examples, the transmitter 1215 may be co-located with a receiver 1210 in a transceiver module. The transmitter 1215 may utilize a single antenna or a set of multiple antennas.

The device 1205, or various components thereof, may be an example of means for performing various aspects of techniques for grouping and reporting antenna subselections for MIMO multiplexing as described herein. For example, the communications manager 1220 may include a grouping parameter manager 1225 a control information manager 1230, or any combination thereof. The communications manager 1220 may be an example of aspects of a communications manager 1120 as described herein. In some examples, the communications manager 1220, or various components thereof, may be configured to perform various operations (e.g., receiving, monitoring, transmitting) using or otherwise in cooperation with the receiver 1210, the transmitter 1215, or both. For example, the communications manager 1220 may receive information from the receiver 1210, send information to the transmitter 1215, or be integrated in combination with the receiver 1210, the transmitter 1215, or both to receive information, transmit information, or perform various other operations as described herein.

The communications manager 1220 may support wireless communication at a control entity in accordance with examples as disclosed herein. The grouping parameter manager 1225 may be configured as or otherwise support a means for transmitting, to at least a first node, an antenna grouping parameter for identification of at least a first subset of a set of antenna elements that meet one or more MIMO communication parameters for MIMO communications between the first node and one or more target nodes, or at least one target wireless node that meets the one or more MIMO communication parameters for at least a second subset of antenna elements. The control information manager 1230 may be configured as or otherwise support a means for receiving, from the first node, an identification of at least the first subset of antenna elements or the at least one target node.

Figure 13:
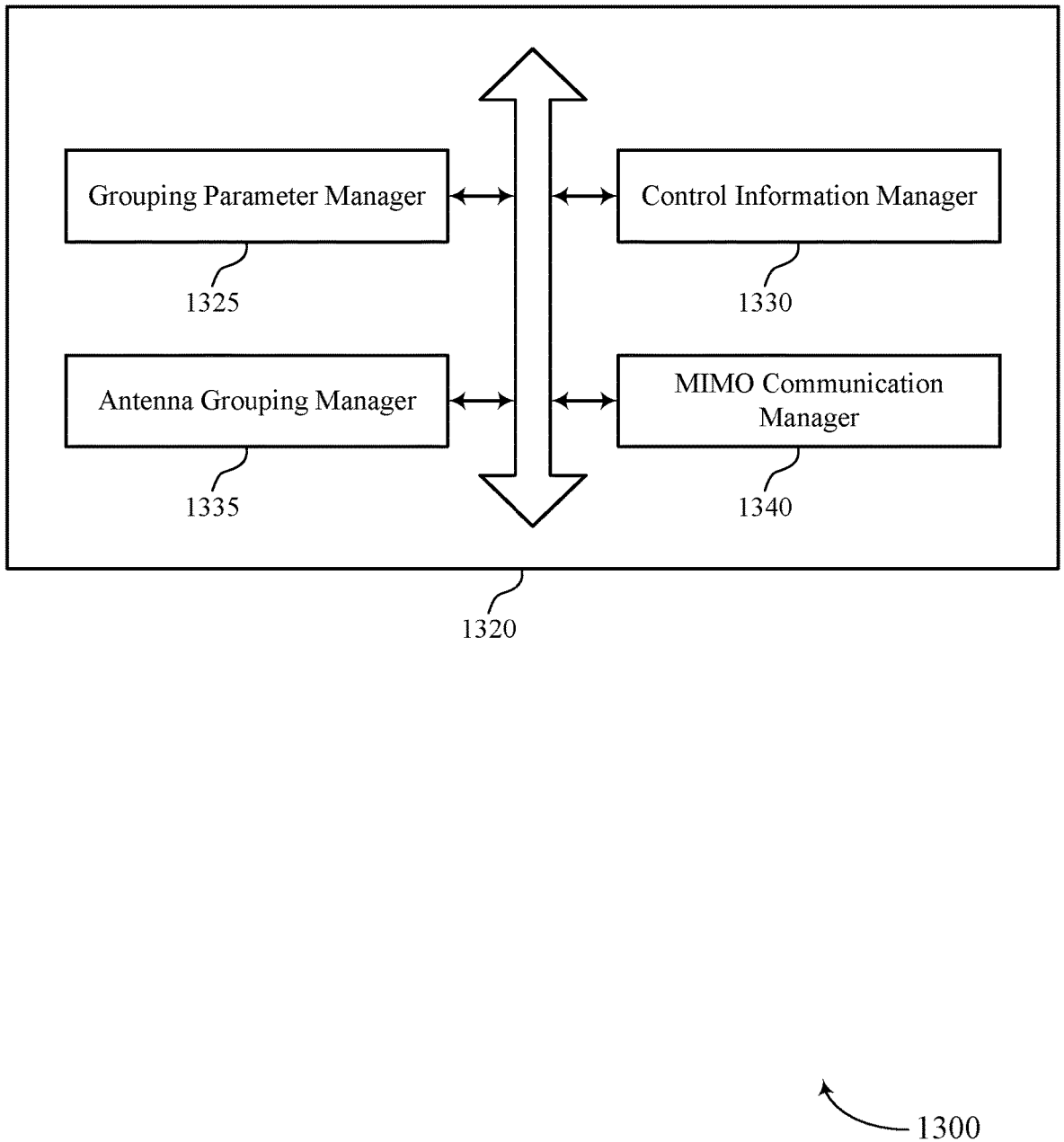
FIG. 13 shows a block diagram of a communications manager that supports techniques for grouping and reporting antenna subselections for MIMO multiplexing in accordance with aspects of the present disclosure.

FIG. 13 shows a block diagram 1300 of a communications manager 1320 that supports techniques for grouping and reporting antenna subselections for MIMO multiplexing in accordance with aspects of the present disclosure. The communications manager 1320 may be an example of aspects of a communications manager 1120, a communications manager 1220, or both, as described herein. The communications manager 1320, or various components thereof, may be an example of means for performing various aspects of techniques for grouping and reporting antenna subselections for MIMO multiplexing as described herein. For example, the communications manager 1320 may include a grouping parameter manager 1325, a control information manager 1330, an antenna grouping manager 1335, a MIMO communication manager 1340, or any combination thereof. Each of these components may communicate, directly or indirectly, with one another (e.g., via one or more buses).

The communications manager 1320 may support wireless communication at a control entity in accordance with examples as disclosed herein. The grouping parameter manager 1325 may be configured as or otherwise support a means for transmitting, to at least a first node, an antenna grouping parameter for identification of at least a first subset of a set of antenna elements that meet one or more MIMO communication parameters for MIMO communications between the first node and one or more target nodes, or at least one target wireless node that meets the one or more MIMO communication parameters for at least a second subset of antenna elements. The control information manager 1330 may be configured as or otherwise support a means for receiving, from the first node, an identification of at least the first subset of antenna elements or the at least one target node. In some examples, the one or more MIMO communication parameters include at least one of a first quantity of singular values of a singular value decomposition of a channel matrix that are within a first range of a largest valued singular value or a value of the first range.

In some examples, the antenna grouping manager 1335 may be configured as or otherwise support a means for receiving, from the first node, an indication of at least the first subset of antenna elements that meets the one or more MIMO communication parameter for each of two or more target nodes. In some examples, at least the first subset of antenna elements meet the one or more MIMO communication parameters for two or more target nodes that are located at different distances from the first node.

In some examples, the control information manager 1330 may be configured as or otherwise support a means for receiving, from the first node, an indication of a set of target nodes that meet the one or more MIMO communication parameters for the at least the second subset of antenna elements. In some examples, the antenna grouping parameter further includes a set of target nodes associated with the one or more MIMO communication parameters, and the identification of at least the first subset of antenna elements is based on the one or more MIMO communication parameters being met for each target node of the set of target nodes. In some examples, the one or more MIMO communication parameters are applied for single-user MIMO or multi-user MIMO.

In some examples, the MIMO communication manager 1340 may be configured as or otherwise support a means for scheduling the first node and the one or more target nodes to use two or more subsets of antennas to transmit a same data transmission to achieve uniform coverage of the same data transmission.

Figure 14:
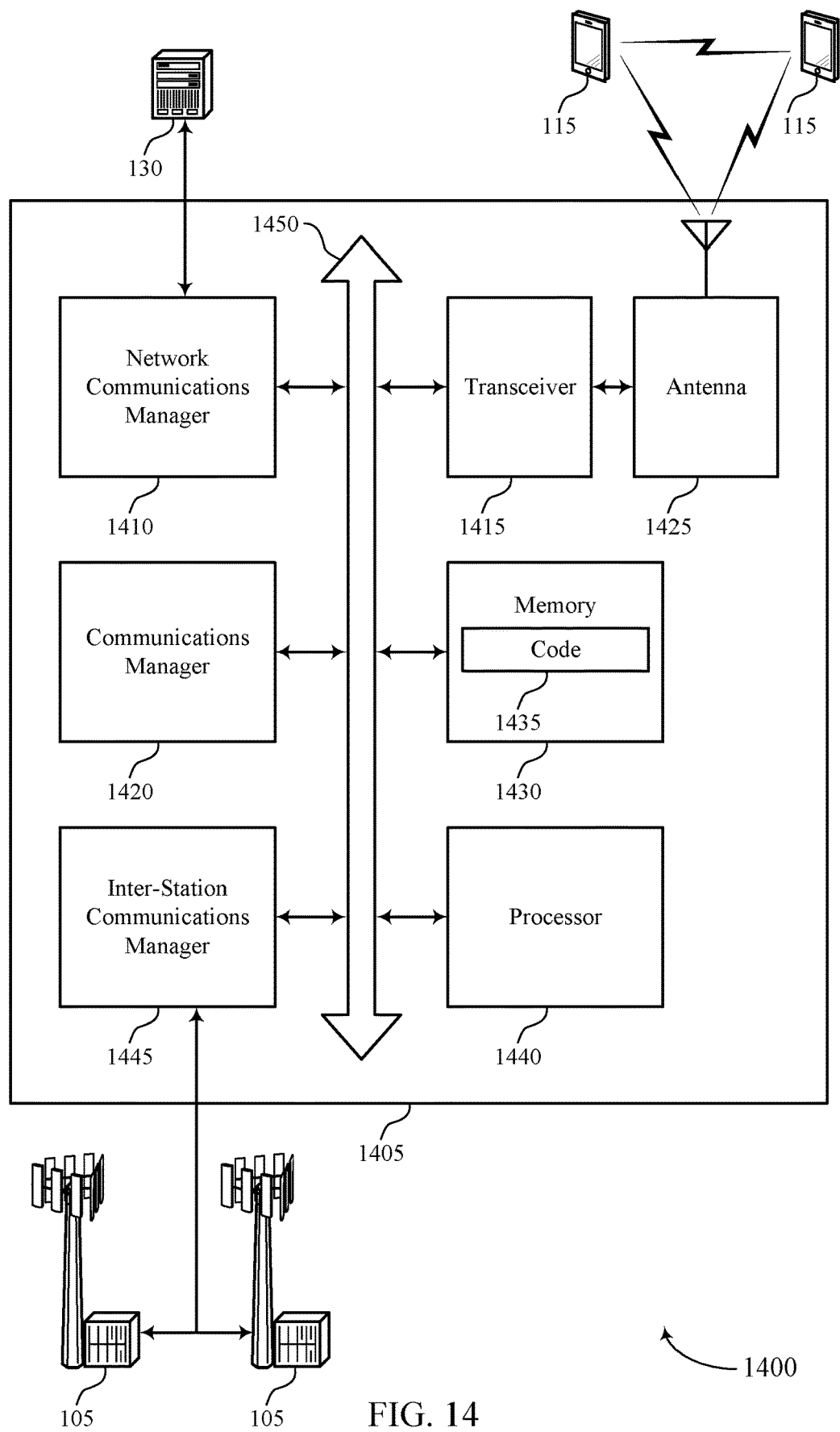
FIG. 14 shows a diagram of a system including a device that supports techniques for grouping and reporting antenna subselections for MIMO multiplexing in accordance with aspects of the present disclosure.

FIG. 14 shows a diagram of a system 1400 including a device 1405 that supports techniques for grouping and reporting antenna subselections for MIMO multiplexing in accordance with aspects of the present disclosure. The device 1405 may be an example of or include the components of a device 1105, a device 1205, or a base station 105 as described herein. The device 1405 may communicate wirelessly with one or more base stations 105, UEs 115, or any combination thereof. The device 1405 may include components for bi-directional voice and data communications including components for transmitting and receiving communications, such as a communications manager 1420, a network communications manager 1410, a transceiver 1415, an antenna 1425, a memory 1430, code 1435, a processor 1440, and an inter-station communications manager 1445. These components may be in electronic communication or otherwise coupled (e.g., operatively, communicatively, functionally, electronically, electrically) via one or more buses (e.g., a bus 1450).

The network communications manager 1410 may manage communications with a core network 130 (e.g., via one or more wired backhaul links). For example, the network communications manager 1410 may manage the transfer of data communications for client devices, such as one or more UEs 115.

In some cases, the device 1405 may include a single antenna 1425. However, in some other cases the device 1405 may have more than one antenna 1425, which may be capable of concurrently transmitting or receiving multiple wireless transmissions. The transceiver 1415 may communicate bi-directionally, via the one or more antennas 1425, wired, or wireless links as described herein. For example, the transceiver 1415 may represent a wireless transceiver and may communicate bi-directionally with another wireless transceiver. The transceiver 1415 may also include a modem to modulate the packets, to provide the modulated packets to one or more antennas 1425 for transmission, and to demodulate packets received from the one or more antennas 1425. The transceiver 1415, or the transceiver 1415 and one or more antennas 1425, may be an example of a transmitter 1115, a transmitter 1215, a receiver 1110, a receiver 1210, or any combination thereof or component thereof, as described herein.

The memory 1430 may include RAM and ROM. The memory 1430 may store computer-readable, computer-executable code 1435 including instructions that, when executed by the processor 1440, cause the device 1405 to perform various functions described herein. The code 1435 may be stored in a non-transitory computer-readable medium such as system memory or another type of memory. In some cases, the code 1435 may not be directly executable by the processor 1440 but may cause a computer (e.g., when compiled and executed) to perform functions described herein. In some cases, the memory 1430 may contain, among other things, a BIOS which may control basic hardware or software operation such as the interaction with peripheral components or devices.

The processor 1440 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1440 may be configured to operate a memory array using a memory controller. In some other cases, a memory controller may be integrated into the processor 1440. The processor 1440 may be configured to execute computer-readable instructions stored in a memory (e.g., the memory 1430) to cause the device 1405 to perform various functions (e.g., functions or tasks supporting techniques for grouping and reporting antenna subselections for MIMO multiplexing). For example, the device 1405 or a component of the device 1405 may include a processor 1440 and memory 1430 coupled to the processor 1440, the processor 1440 and memory 1430 configured to perform various functions described herein.

The inter-station communications manager 1445 may manage communications with other base stations 105, and may include a controller or scheduler for controlling communications with UEs 115 in cooperation with other base stations 105. For example, the inter-station communications manager 1445 may coordinate scheduling for transmissions to UEs 115 for various interference mitigation techniques such as beamforming or joint transmission. In some examples, the inter-station communications manager 1445 may provide an X2 interface within an LTE/LTE-A wireless communications network technology to provide communication between base stations 105.

The communications manager 1420 may support wireless communication at a control entity in accordance with examples as disclosed herein. For example, the communications manager 1420 may be configured as or otherwise support a means for transmitting, to at least a first node, an antenna grouping parameter for identification of at least a first subset of a set of antenna elements that meet one or more MIMO communication parameters for MIMO communications between the first node and one or more target nodes, or at least one target wireless node that meets the one or more MIMO communication parameters for at least a second subset of antenna elements. The communications manager 1420 may be configured as or otherwise support a means for receiving, from the first node, an identification of at least the first subset of antenna elements or the at least one target node.

By including or configuring the communications manager 1420 in accordance with examples as described herein, the device 1405 may support techniques for efficient antenna selection and reporting at a wireless device. For example, implementation of antenna selection techniques at a wireless node may allow for LOS MIMO communications at the node with enhanced data transfer rates. Further, efficient signaling of identified antenna groups, identified target nodes, or both, that can support MIMO communications may allow for efficient scheduling of MIMO communications. Such techniques may thus result in improvement in both uplink and downlink performance, reliability, and enhance user experience.

In some examples, the communications manager 1420 may be configured to perform various operations (e.g., receiving, monitoring, transmitting) using or otherwise in cooperation with the transceiver 1415, the one or more antennas 1425, or any combination thereof. Although the communications manager 1420 is illustrated as a separate component, in some examples, one or more functions described with reference to the communications manager 1420 may be supported by or performed by the processor 1440, the memory 1430, the code 1435, or any combination thereof. For example, the code 1435 may include instructions executable by the processor 1440 to cause the device 1405 to perform various aspects of techniques for grouping and reporting antenna subselections for MIMO multiplexing as described herein, or the processor 1440 and the memory 1430 may be otherwise configured to perform or support such operations.

Figure 15:
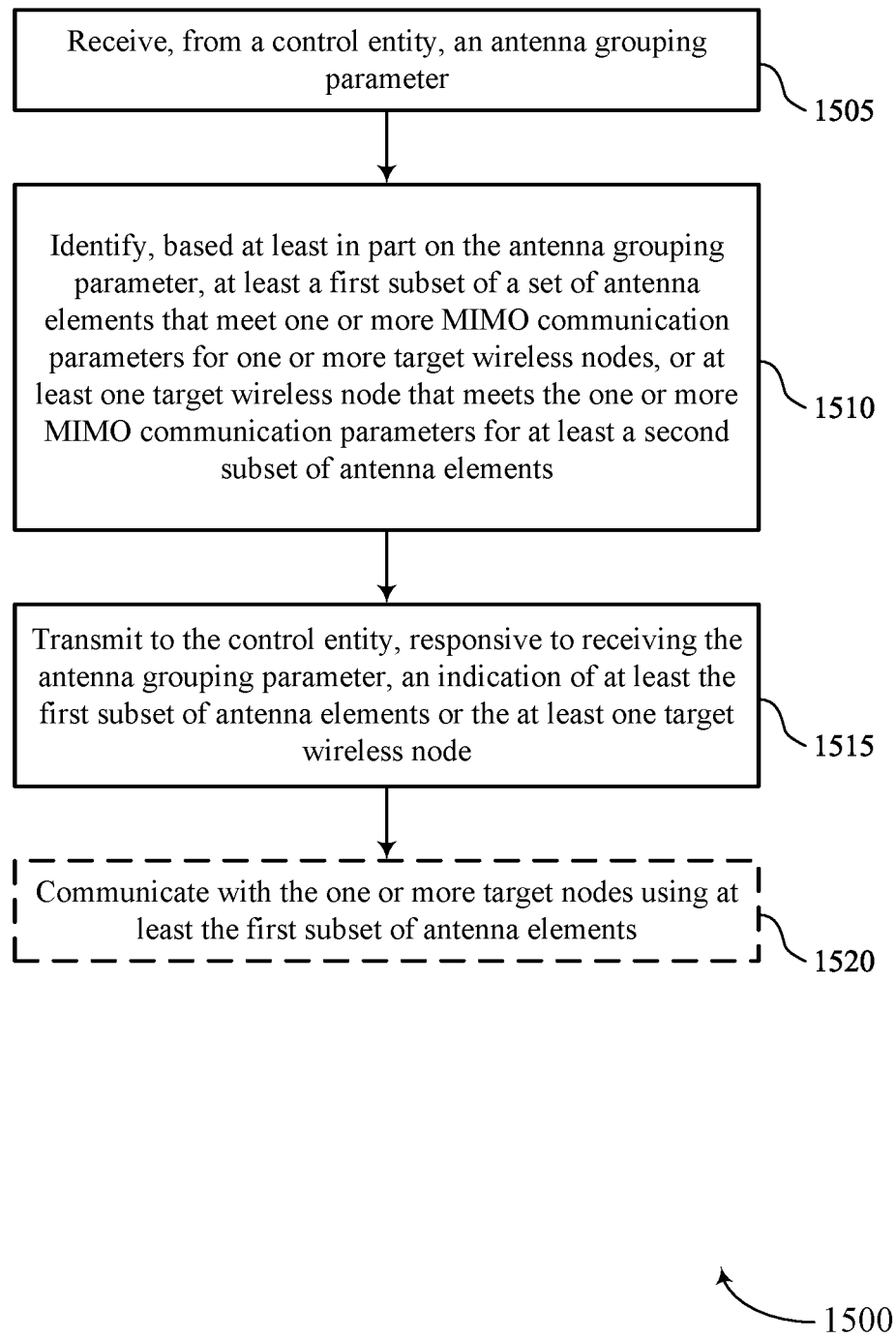
FIGS. 15 through 21 show flowcharts illustrating methods that support techniques for grouping and reporting antenna subselections for MIMO multiplexing in accordance with aspects of the present disclosure.

FIG. 15 shows a flowchart illustrating a method 1500 that supports techniques for grouping and reporting antenna subselections for MIMO multiplexing in accordance with aspects of the present disclosure. The operations of the method 1500 may be implemented by a UE or its components as described herein. For example, the operations of the method 1500 may be performed by a UE 115 as described with reference to FIGS. 1 through 10. In some examples, a UE may execute a set of instructions to control the functional elements of the UE to perform the described functions. Additionally or alternatively, the UE may perform aspects of the described functions using special-purpose hardware.

At 1505, the method may include receiving, from a control entity, an antenna grouping parameter. The operations of 1505 may be performed in accordance with examples as disclosed herein. In some examples, aspects of the operations of 1505 may be performed by a grouping parameter manager 925 as described with reference to FIG. 9.

At 1510, the method may include identifying, based on the antenna grouping parameter, at least a first subset of a set of antenna elements that meet one or more MIMO communication parameters for one or more target wireless nodes, or at least one target wireless node that meets the one or more MIMO communication parameters for at least a second subset of antenna elements. The operations of 1510 may be performed in accordance with examples as disclosed herein. In some examples, aspects of the operations of 1510 may be performed by an antenna grouping manager 930 as described with reference to FIG. 9.

At 1515, the method may include transmitting to the control entity, responsive to receiving the antenna grouping parameter, an indication of at least the first subset of antenna elements or the at least one target wireless node. The operations of 1515 may be performed in accordance with examples as disclosed herein. In some examples, aspects of the operations of 1515 may be performed by a control information manager 935 as described with reference to FIG. 9.

At 1520, the method may include communicating with the one or more target nodes using at least the first subset of antenna elements. The operations of 1520 may be performed in accordance with examples as disclosed herein. In some examples, aspects of the operations of 1520 may be performed by a MIMO communication manager 940 as described with reference to FIG. 9.

Figure 16:
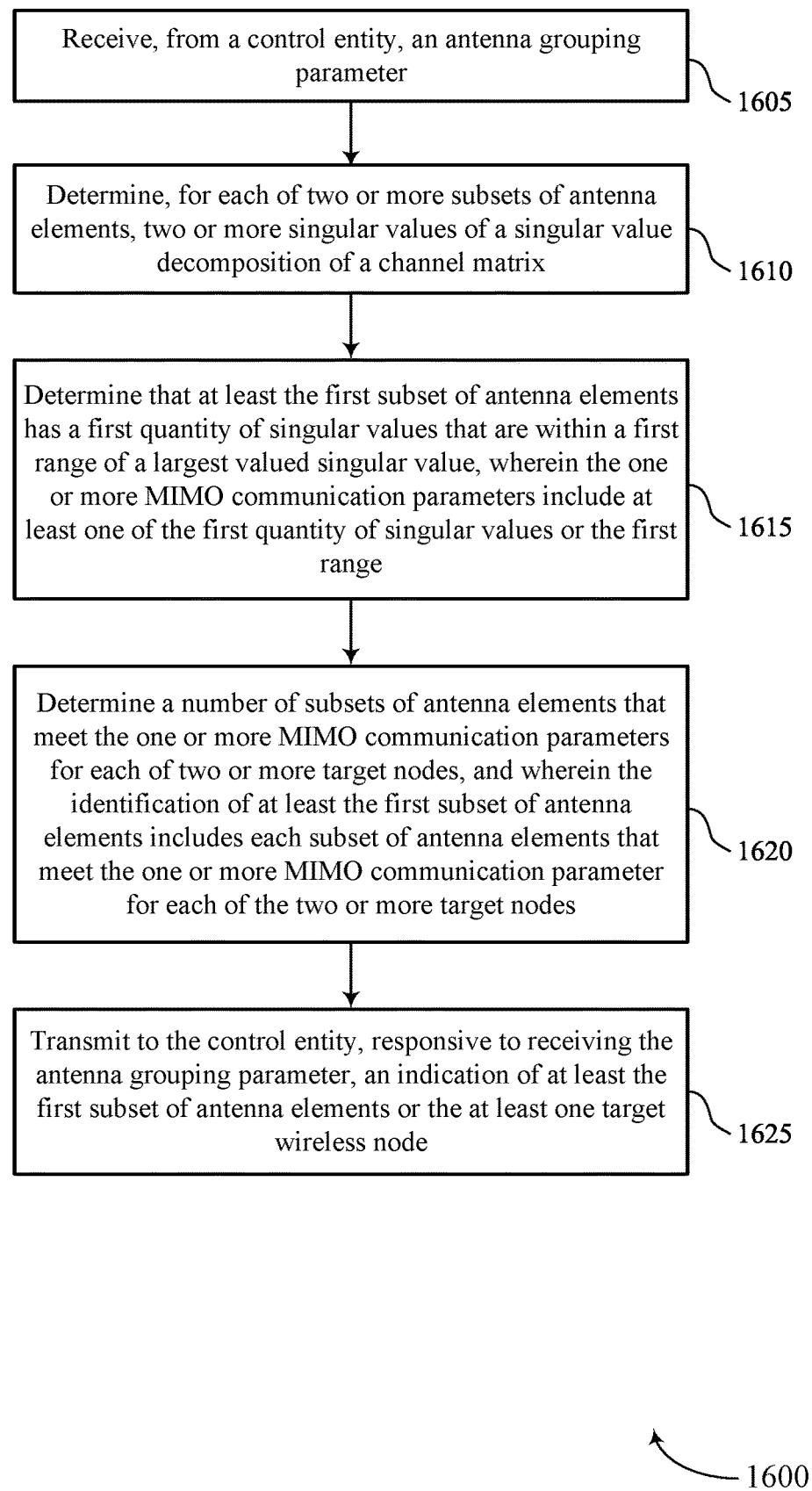

FIG. 16 shows a flowchart illustrating a method 1600 that supports techniques for grouping and reporting antenna subselections for MIMO multiplexing in accordance with aspects of the present disclosure. The operations of the method 1600 may be implemented by a UE or its components as described herein. For example, the operations of the method 1600 may be performed by a UE 115 as described with reference to FIGS. 1 through 10. In some examples, a UE may execute a set of instructions to control the functional elements of the UE to perform the described functions. Additionally or alternatively, the UE may perform aspects of the described functions using special-purpose hardware.

At 1605, the method may include receiving, from a control entity, an antenna grouping parameter. The operations of 1605 may be performed in accordance with examples as disclosed herein. In some examples, aspects of the operations of 1605 may be performed by a grouping parameter manager 925 as described with reference to FIG. 9.

At 1610, the method may include determining, for each of two or more subsets of antenna elements, two or more singular values of a singular value decomposition of a channel matrix. The operations of 1610 may be performed in accordance with examples as disclosed herein. In some examples, aspects of the operations of 1610 may be performed by an antenna grouping manager 930 as described with reference to FIG. 9.

At 1615, the method may include determining that at least the first subset of antenna elements has a first quantity of singular values that are within a first range of a largest valued singular value, where the one or more MIMO communication parameters include at least one of the first quantity of singular values or the first range. The operations of 1615 may be performed in accordance with examples as disclosed herein. In some examples, aspects of the operations of 1615 may be performed by an antenna grouping manager 930 as described with reference to FIG. 9.

At 1620, the method may include determining a number of subsets of antenna elements that meet the one or more MIMO communication parameters for each of two or more target nodes, and where the identification of at least the first subset of antenna elements includes each subset of antenna elements that meet the one or more MIMO communication parameter for each of the two or more target nodes. The operations of 1620 may be performed in accordance with examples as disclosed herein. In some examples, aspects of the operations of 1620 may be performed by an antenna grouping manager 930 as described with reference to FIG. 9.

At 1625, the method may include transmitting to the control entity, responsive to receiving the antenna grouping parameter, an indication of at least the first subset of antenna elements or the at least one target wireless node. The operations of 1625 may be performed in accordance with examples as disclosed herein. In some examples, aspects of the operations of 1625 may be performed by a control information manager 935 as described with reference to FIG. 9.

Figure 17:
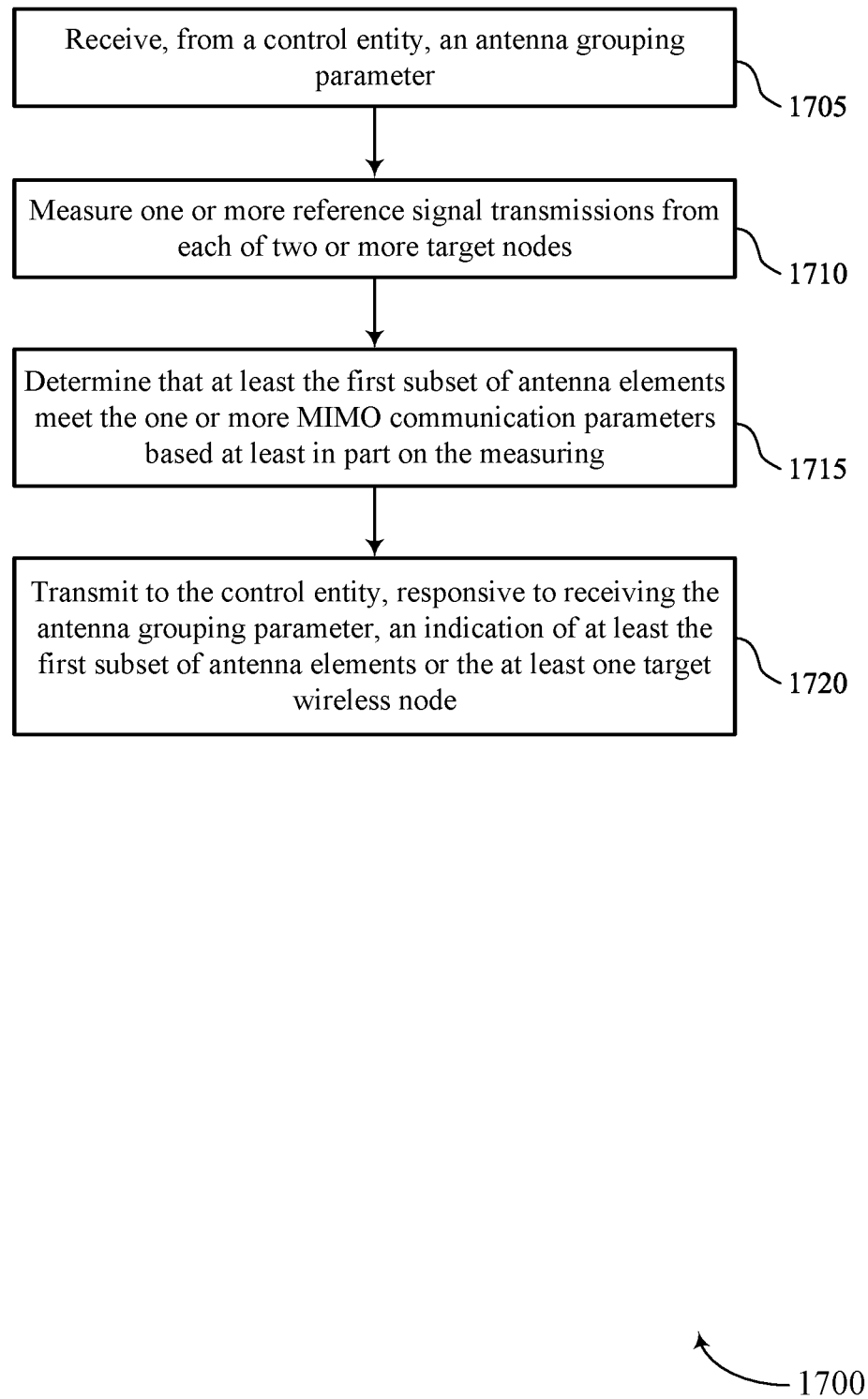

FIG. 17 shows a flowchart illustrating a method 1700 that supports techniques for grouping and reporting antenna subselections for MIMO multiplexing in accordance with aspects of the present disclosure. The operations of the method 1700 may be implemented by a UE or its components as described herein. For example, the operations of the method 1700 may be performed by a UE 115 as described with reference to FIGS. 1 through 10. In some examples, a UE may execute a set of instructions to control the functional elements of the UE to perform the described functions. Additionally or alternatively, the UE may perform aspects of the described functions using special-purpose hardware.

At 1705, the method may include receiving, from a control entity, an antenna grouping parameter. The operations of 1705 may be performed in accordance with examples as disclosed herein. In some examples, aspects of the operations of 1705 may be performed by a grouping parameter manager 925 as described with reference to FIG. 9.

At 1710, the method may include measuring one or more reference signal transmissions from each of two or more target nodes. The operations of 1710 may be performed in accordance with examples as disclosed herein. In some examples, aspects of the operations of 1710 may be performed by a measurement manager 945 as described with reference to FIG. 9.

At 1715, the method may include determining that at least the first subset of antenna elements meet the one or more MIMO communication parameters based on the measuring. The operations of 1715 may be performed in accordance with examples as disclosed herein. In some examples, aspects of the operations of 1715 may be performed by a measurement manager 945 as described with reference to FIG. 9.

At 1720, the method may include transmitting to the control entity, responsive to receiving the antenna grouping parameter, an indication of at least the first subset of antenna elements or the at least one target wireless node. The operations of 1720 may be performed in accordance with examples as disclosed herein. In some examples, aspects of the operations of 1720 may be performed by a control information manager 935 as described with reference to FIG. 9.

Figure 18:
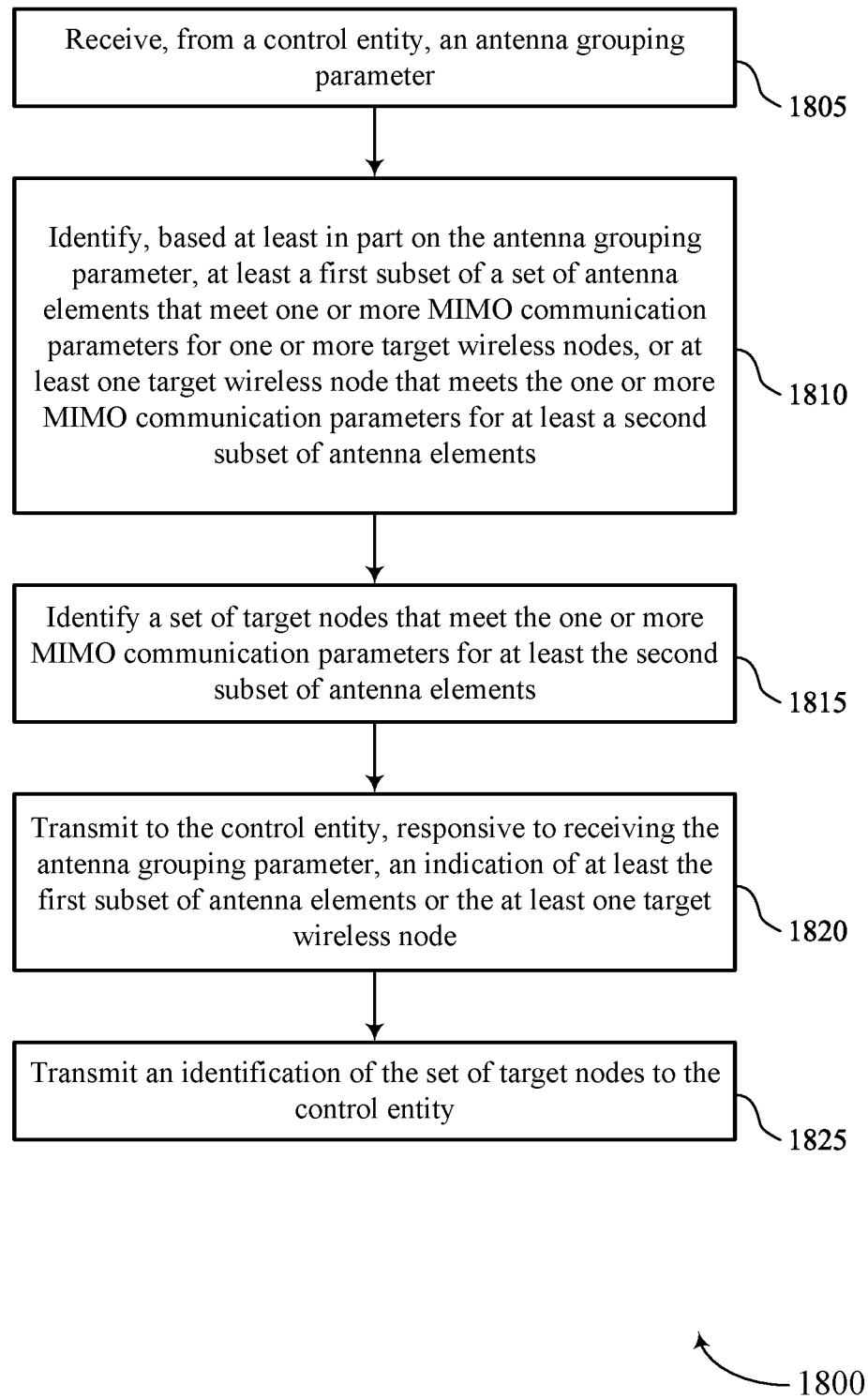

FIG. 18 shows a flowchart illustrating a method 1800 that supports techniques for grouping and reporting antenna subselections for MIMO multiplexing in accordance with aspects of the present disclosure. The operations of the method 1800 may be implemented by a UE or its components as described herein. For example, the operations of the method 1800 may be performed by a UE 115 as described with reference to FIGS. 1 through 10. In some examples, a UE may execute a set of instructions to control the functional elements of the UE to perform the described functions. Additionally or alternatively, the UE may perform aspects of the described functions using special-purpose hardware.

At 1805, the method may include receiving, from a control entity, an antenna grouping parameter. The operations of 1805 may be performed in accordance with examples as disclosed herein. In some examples, aspects of the operations of 1805 may be performed by a grouping parameter manager 925 as described with reference to FIG. 9.

At 1810, the method may include identifying, based on the antenna grouping parameter, at least a first subset of a set of antenna elements that meet one or more MIMO communication parameters for one or more target wireless nodes, or at least one target wireless node that meets the one or more MIMO communication parameters for at least a second subset of antenna elements. The operations of 1810 may be performed in accordance with examples as disclosed herein. In some examples, aspects of the operations of 1810 may be performed by an antenna grouping manager 930 as described with reference to FIG. 9.

At 1815, the method may include identifying a set of target nodes that meet the one or more MIMO communication parameters for at least the second subset of antenna elements. The operations of 1815 may be performed in accordance with examples as disclosed herein. In some examples, aspects of the operations of 1815 may be performed by a grouping parameter manager 925 as described with reference to FIG. 9.

At 1820, the method may include transmitting to the control entity, responsive to receiving the antenna grouping parameter, an indication of at least the first subset of antenna elements or the at least one target wireless node. The operations of 1820 may be performed in accordance with examples as disclosed herein. In some examples, aspects of the operations of 1820 may be performed by a control information manager 935 as described with reference to FIG. 9.

At 1825, the method may include transmitting an identification of the set of target nodes to the control entity. The operations of 1825 may be performed in accordance with examples as disclosed herein. In some examples, aspects of the operations of 1825 may be performed by a control information manager 935 as described with reference to FIG. 9.

Figure 19:
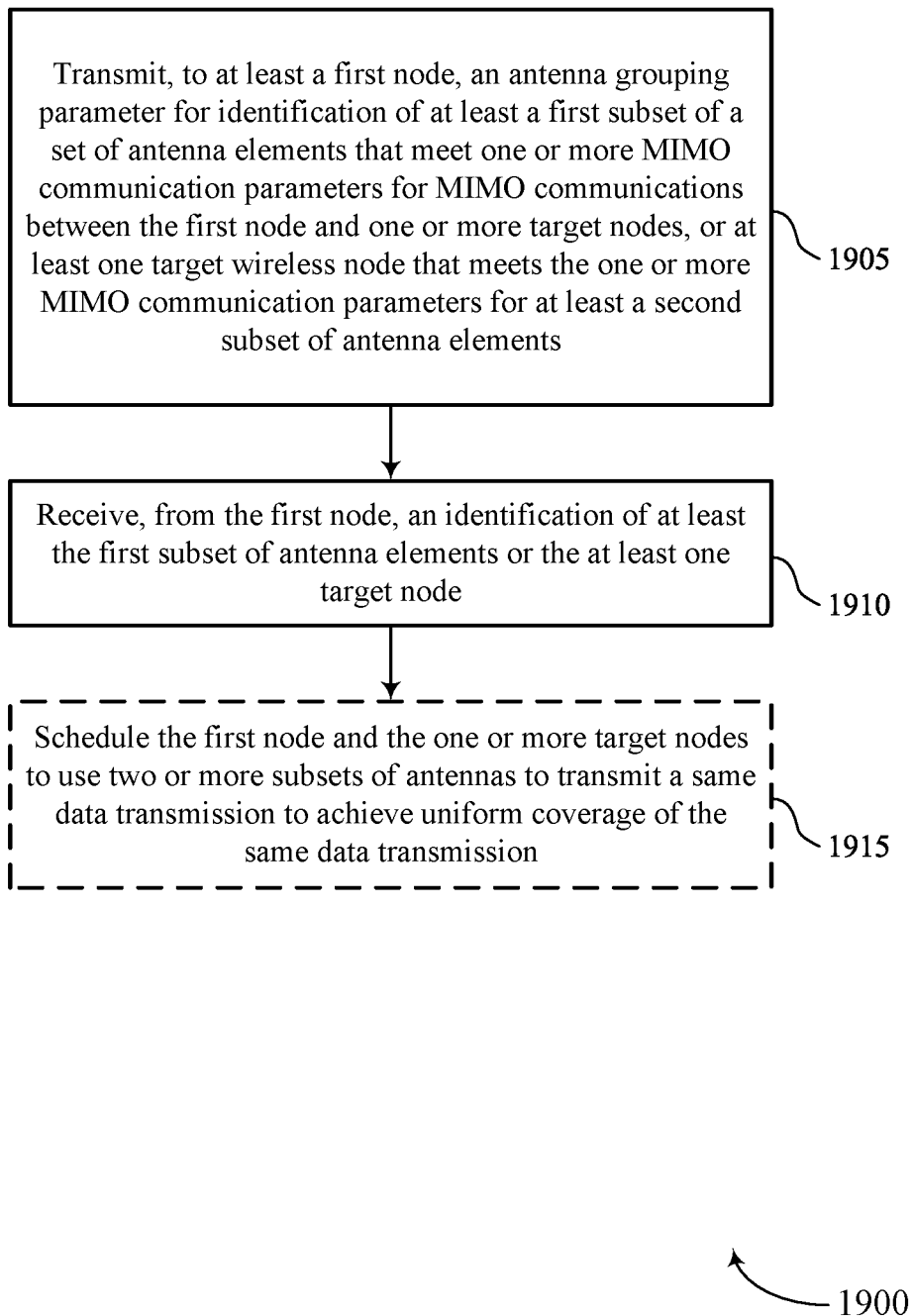

FIG. 19 shows a flowchart illustrating a method 1900 that supports techniques for grouping and reporting antenna subselections for MIMO multiplexing in accordance with aspects of the present disclosure. The operations of the method 1900 may be implemented by a UE or a base station or its components as described herein. For example, the operations of the method 1900 may be performed by a UE 115 as described with reference to FIGS. 1 through 10 or a base station 105 as described with reference to FIGS. 1 through 6 and 11 through 14. In some examples, a UE or a base station may execute a set of instructions to control the functional elements of the UE or the base station to perform the described functions. Additionally or alternatively, the UE or the base station may perform aspects of the described functions using special-purpose hardware.

At 1905, the method may include transmitting, to at least a first node, an antenna grouping parameter for identification of at least a first subset of a set of antenna elements that meet one or more MIMO communication parameters for MIMO communications between the first node and one or more target nodes, or at least one target wireless node that meets the one or more MIMO communication parameters for at least a second subset of antenna elements. The operations of 1905 may be performed in accordance with examples as disclosed herein. In some examples, aspects of the operations of 1905 may be performed by a grouping parameter manager 925 or a grouping parameter manager 1325 as described with reference to FIGS. 9 and 13.

At 1910, the method may include receiving, from the first node, an identification of at least the first subset of antenna elements or the at least one target node. The operations of 1910 may be performed in accordance with examples as disclosed herein. In some examples, aspects of the operations of 1910 may be performed by a control information manager 935 or a control information manager 1330 as described with reference to FIGS. 9 and 13.

At 1915, the method may include scheduling the first node and the one or more target nodes to use two or more subsets of antennas to transmit a same data transmission to achieve uniform coverage of the same data transmission. The operations of 1915 may be performed in accordance with examples as disclosed herein. In some examples, aspects of the operations of 1915 may be performed by a MIMO communication manager 940 or a MIMO communication manager 1340 as described with reference to FIGS. 9 and 13.

Figure 20:
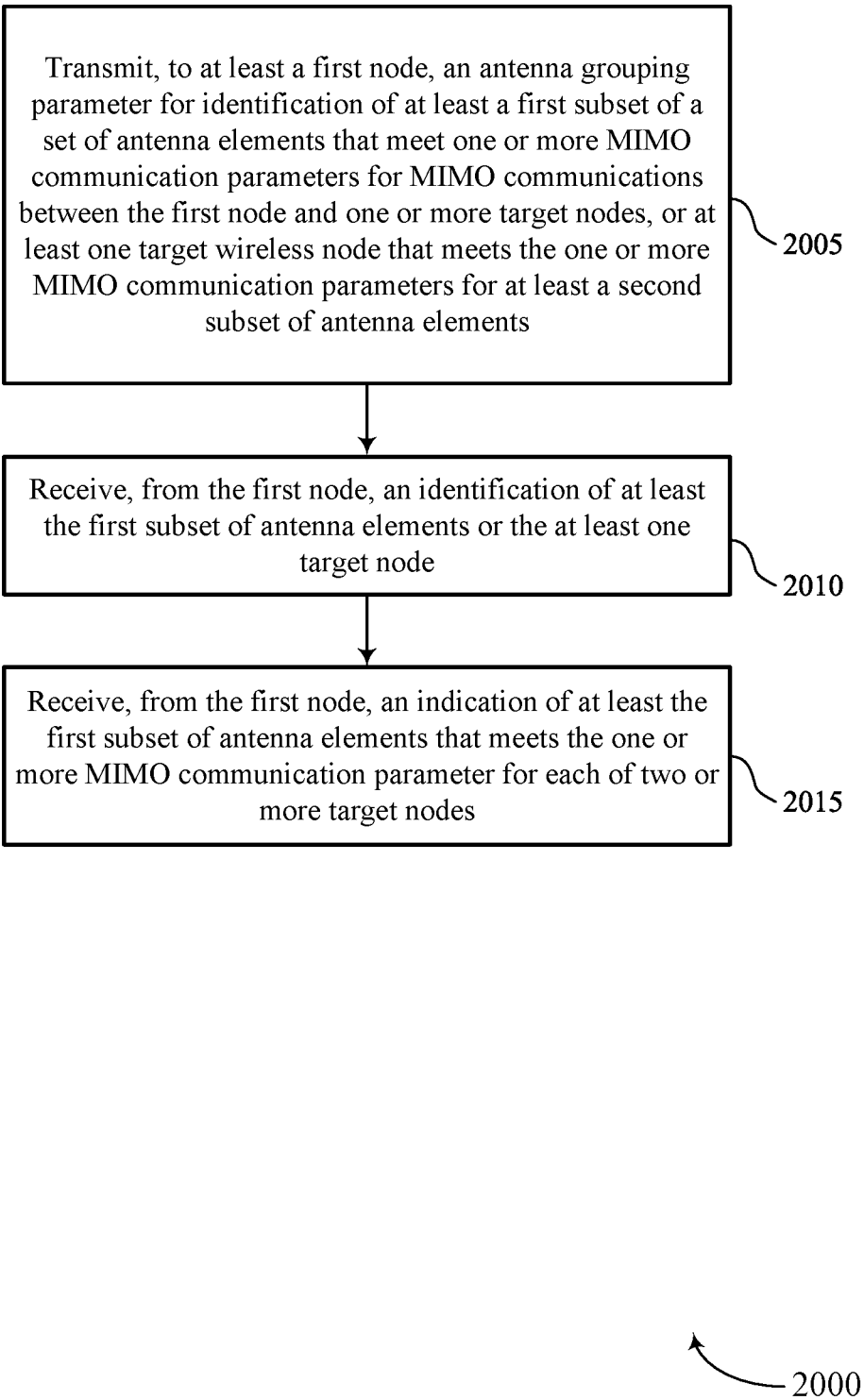

FIG. 20 shows a flowchart illustrating a method 2000 that supports techniques for grouping and reporting antenna subselections for MIMO multiplexing in accordance with aspects of the present disclosure. The operations of the method 2000 may be implemented by a UE or a base station or its components as described herein. For example, the operations of the method 2000 may be performed by a UE 115 as described with reference to FIGS. 1 through 10 or a base station 105 as described with reference to FIGS. 1 through 6 and 11 through 14. In some examples, a UE or a base station may execute a set of instructions to control the functional elements of the UE or the base station to perform the described functions. Additionally or alternatively, the UE or the base station may perform aspects of the described functions using special-purpose hardware.

At 2005, the method may include transmitting, to at least a first node, an antenna grouping parameter for identification of at least a first subset of a set of antenna elements that meet one or more MIMO communication parameters for MIMO communications between the first node and one or more target nodes, or at least one target wireless node that meets the one or more MIMO communication parameters for at least a second subset of antenna elements. The operations of 2005 may be performed in accordance with examples as disclosed herein. In some examples, aspects of the opera-
tions of 2005 may be performed by a grouping parameter manager 925 or a grouping parameter manager 1325 as described with reference to FIGS. 9 and 13. In some cases, the one or more MIMO communication parameters include at least one of a first quantity of singular values of a singular value decomposition of a channel matrix that are within a first range of a largest valued singular value or a value of the first range.

At 2010, the method may include receiving, from the first node, an identification of at least the first subset of antenna elements or the at least one target node. The operations of 2010 may be performed in accordance with examples as disclosed herein. In some examples, aspects of the operations of 2010 may be performed by a control information manager 935 or a control information manager 1330 as described with reference to FIGS. 9 and 13.

At 2015, the method may include receiving, from the first node, an indication of at least the first subset of antenna elements that meets the one or more MIMO communication parameter for each of two or more target nodes. The operations of 2015 may be performed in accordance with examples as disclosed herein. In some examples, aspects of the operations of 2015 may be performed by an antenna grouping manager 930 or an antenna grouping manager 1335 as described with reference to FIGS. 9 and 13.

Figure 21:
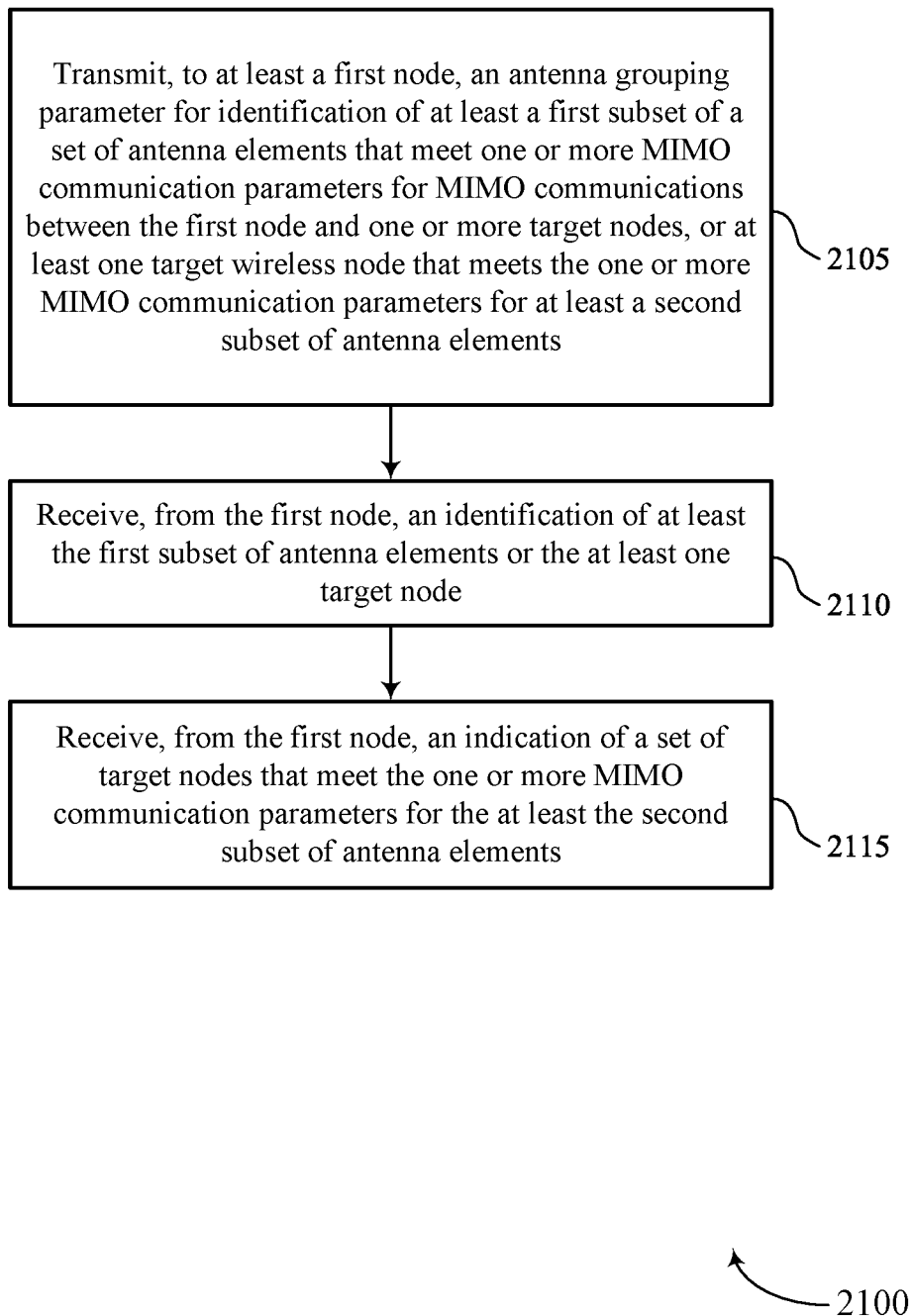

FIG. 21 shows a flowchart illustrating a method 2100 that supports techniques for grouping and reporting antenna subselections for MIMO multiplexing in accordance with aspects of the present disclosure. The operations of the method 2100 may be implemented by a UE or a base station or its components as described herein. For example, the operations of the method 2100 may be performed by a UE 115 as described with reference to FIGS. 1 through 10 or a base station 105 as described with reference to FIGS. 1 through 6 and 11 through 14. In some examples, a UE or a base station may execute a set of instructions to control the functional elements of the UE or the base station to perform the described functions. Additionally or alternatively, the UE or the base station may perform aspects of the described functions using special-purpose hardware.

At 2105, the method may include transmitting, to at least a first node, an antenna grouping parameter for identification of at least a first subset of a set of antenna elements that meet one or more MIMO communication parameters for MIMO communications between the first node and one or more target nodes, or at least one target wireless node that meets the one or more MIMO communication parameters for at least a second subset of antenna elements. The operations of 2105 may be performed in accordance with examples as disclosed herein. In some examples, aspects of the operations of 2105 may be performed by a grouping parameter manager 925 or a grouping parameter manager 1325 as described with reference to FIGS. 9 and 13.

At 2110, the method may include receiving, from the first node, an identification of at least the first subset of antenna elements or the at least one target node. The operations of 2110 may be performed in accordance with examples as disclosed herein. In some examples, aspects of the operations of 2110 may be performed by a control information manager 935 or a control information manager 1330 as described with reference to FIGS. 9 and 13.

At 2115, the method may include receiving, from the first node, an indication of a set of target nodes that meet the one or more MIMO communication parameters for the at least the second subset of antenna elements. The operations of 2115 may be performed in accordance with examples as disclosed herein. In some examples, aspects of the operations of 2115 may be performed by a control information manager 935 or a control information manager 1330 as described with reference to FIGS. 9 and 13.

The following provides an overview of aspects of the present disclosure:

Aspect 1: A method for wireless communication at a first wireless node, comprising: receiving, from a control entity, an antenna grouping parameter; identifying, based at least in part on the antenna grouping parameter, at least a first subset of a set of antenna elements that meet one or more multiple-input multiple-output (MIMO) communication parameters for one or more target wireless nodes, or at least one target wireless node that meets the one or more MIMO communication parameters for at least a second subset of antenna elements; and transmitting to the control entity, responsive to receiving the antenna grouping parameter, an indication of at least the first subset of antenna elements or the at least one target wireless node.

Aspect 2: The method of aspect 1, further comprising: determining, for each of two or more subsets of antenna elements, two or more singular values of a singular value decomposition of a channel matrix; and determining that at least the first subset of antenna elements has a first quantity of singular values that are within a first range of a largest valued singular value, wherein the one or more MIMO communication parameters include at least one of the first quantity of singular values or the first range.

Aspect 3: The method of aspect 2, further comprising: determining a number of subsets of antenna elements that meet the one or more MIMO communication parameters for each of two or more target nodes, and wherein the identification of at least the first subset of antenna elements includes each subset of antenna elements that meet the one or more MIMO communication parameter for each of the two or more target nodes.

Aspect 4: The method of any of aspects 1 through 3, further comprising: communicating with the one or more target nodes using at least the first subset of antenna elements.

Aspect 5: The method of any of aspects 1 through 4, wherein each antenna element of the set of antenna elements is connectable to one or more radio chains, and at least the first subset of antenna elements is determined based at least in part on different combinations of antenna elements that are concurrently usable with different radio chains.

Aspect 6: The method of aspect 5, wherein at least the first subset of antenna elements is further determined based at least in part on a non-uniform spacing between different antenna elements of the set of antenna elements.

Aspect 7: The method of aspect 6, wherein the set of antenna elements includes individual antenna elements that are arranged with a uniform spacing, and the non-uniform spacing between different antenna elements is achieved through selectively enabling antenna elements such that adjacent antenna elements of consecutive pairs of antenna elements in at least the first subset of antenna elements have different spacings.

Aspect 8: The method of any of aspects 1 through 7, wherein at least the first subset of antenna elements meets the one or more MIMO communication parameters for two or more target nodes that are located at different distances from the first wireless node.

Aspect 9: The method of any of aspects 1 through 8, further comprising: measuring one or more reference signal transmissions from each of two or more target nodes; and determining that at least the first subset of antenna elements meet the one or more MIMO communication parameters based at least in part on the measuring.

Aspect 10: The method of any of aspects 1 through 9, further comprising: identifying a set of target nodes that meet the one or more MIMO communication parameters for at least the second subset of antenna elements; and transmitting an identification of the set of target nodes to the control entity.

Aspect 11: The method of any of aspects 1 through 10, wherein the antenna grouping parameter includes a set of target nodes associated with the one or more MIMO communication parameters, and the identification of at least the first subset of antenna elements is based at least in part on the one or more MIMO communication parameters being met for each target node of the set of target nodes.

Aspect 12: The method of any of aspects 1 through 11, wherein the one or more MIMO communication parameters are applied for single-user MIMO or multi-user MIMO.

Aspect 13: The method of any of aspects 1 through 12, further comprising: communicating with one or more target nodes using two or more subsets of antennas to transmit a same data transmission to achieve uniform coverage of the same data transmission.

Aspect 14: A method for wireless communication at a control entity, comprising: transmitting, to at least a first node, an antenna grouping parameter for identification of at least a first subset of a set of antenna elements that meet one or more multiple-input multiple-output (MIMO) communication parameters for MIMO communications between the first node and one or more target nodes, or at least one target wireless node that meets the one or more MIMO communication parameters for at least a second subset of antenna elements; and receiving, from the first node, an identification of at least the first subset of antenna elements or the at least one target node.

Aspect 15: The method of aspect 14, wherein the one or more MIMO communication parameters include at least one of a first quantity of singular values of a singular value decomposition of a channel matrix that are within a first range of a largest valued singular value or a value of the first range.

Aspect 16: The method of aspect 15, further comprising: receiving, from the first node, an indication of at least the first subset of antenna elements that meets the one or more MIMO communication parameter for each of two or more target nodes.

Aspect 17: The method of any of aspects 14 through 16, wherein at least the first subset of antenna elements meet the one or more MIMO communication parameters for two or more target nodes that are located at different distances from the first node.

Aspect 18: The method of any of aspects 14 through 17, further comprising: receiving, from the first node, an indication of a set of target nodes that meet the one or more MIMO communication parameters for the at least the second subset of antenna elements.

Aspect 19: The method of any of aspects 14 through 18, wherein the antenna grouping parameter further includes a set of target nodes associated with the one or more MIMO communication parameters, and the identification of at least the first subset of antenna elements is based at least in part on the one or more MIMO communication parameters being met for each target node of the set of target nodes.

Aspect 20: The method of any of aspects 14 through 19, wherein the one or more MIMO communication parameters are applied for single-user MIMO or multi-user MIMO.

Aspect 21: The method of any of aspects 14 through 20, further comprising: scheduling the first node and the one or more target nodes to use two or more subsets of antennas to transmit a same data transmission to achieve uniform coverage of the same data transmission.

Aspect 22: An apparatus for wireless communication at a first wireless node, comprising a processor; memory coupled with the processor; and instructions stored in the memory and executable by the processor to cause the apparatus to perform a method of any of aspects 1 through 13.

Aspect 23: An apparatus for wireless communication at a first wireless node, comprising at least one means for performing a method of any of aspects 1 through 13.

Aspect 24: A non-transitory computer-readable medium storing code for wireless communication at a first wireless node, the code comprising instructions executable by a processor to perform a method of any of aspects 1 through 13.

Aspect 25: An apparatus for wireless communication at a control entity, comprising a processor; memory coupled with the processor; and instructions stored in the memory and executable by the processor to cause the apparatus to perform a method of any of aspects 14 through 21.

Aspect 26: An apparatus for wireless communication at a control entity, comprising at least one means for performing a method of any of aspects 14 through 21.

Aspect 27: A non-transitory computer-readable medium storing code for wireless communication at a control entity, the code comprising instructions executable by a processor to perform a method of any of aspects 14 through 21.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a first wireless node, comprising:
  receiving, from a control entity, an antenna grouping parameter associated with a set of antenna elements of the first wireless node;
  identifying, based at least in part on the antenna grouping parameter, at least a first subset of antenna elements of the set of antenna elements that meet one or more multiple-input multiple-output (MIMO) communication parameters for one or more target wireless nodes, or at least one target wireless node that meets the one or more MIMO communication parameters for at least a second subset of antenna elements of the set of antenna elements; and
  transmitting to the control entity, responsive to receiving the antenna grouping parameter, an indication of at least the first subset of antenna elements or the at least one target wireless node.

2. The method of claim 1, further comprising:
  determining, for each of two or more subsets of antenna elements, two or more singular values of a singular value decomposition of a channel matrix; and
  determining that at least the first subset of antenna elements has a first quantity of singular values that are within a first range of a largest valued singular value, wherein the one or more MIMO communication parameters include at least one of the first quantity of singular values or the first range.

3. The method of claim 2, further comprising:
  determining a number of subsets of antenna elements that meet the one or more MIMO communication parameters for each of two or more target wireless nodes, and wherein the identification of at least the first subset of antenna elements includes each subset of antenna elements that meet the one or more MIMO communication parameter for each of the two or more target wireless nodes.

4. The method of claim 1, further comprising:
  communicating with the one or more target wireless nodes using at least the first subset of antenna elements.

5. The method of claim 1, wherein each antenna element of the set of antenna elements is connectable to one or more radio chains, and at least the first subset of antenna elements is determined based at least in part on different combinations of antenna elements that are concurrently usable with different radio chains.

6. The method of claim 5, wherein at least the first subset of antenna elements is further determined based at least in part on a non-uniform spacing between different antenna elements of the set of antenna elements.

7. The method of claim 6, wherein the set of antenna elements includes individual antenna elements that are arranged with a uniform spacing, and the non-uniform spacing between different antenna elements is achieved through selectively enabling antenna elements such that adjacent antenna elements of consecutive pairs of antenna elements in at least the first subset of antenna elements have different spacings.

8. The method of claim 1, wherein at least the first subset of antenna elements meets the one or more MIMO communication parameters for two or more target wireless nodes that are located at different distances from the first wireless node.

9. The method of claim 1, further comprising:
  measuring one or more reference signal transmissions from each of two or more target wireless nodes; and
  determining that at least the first subset of antenna elements meet the one or more MIMO communication parameters based at least in part on the measuring.

10. The method of claim 1, further comprising:
  identifying a set of target wireless nodes that meet the one or more MIMO communication parameters for at least the second subset of antenna elements; and
  transmitting an identification of the set of target wireless nodes to the control entity.

11. The method of claim 1, wherein the antenna grouping parameter includes a set of target wireless nodes associated with the one or more MIMO communication parameters, and the identification of at least the first subset of antenna elements is based at least in part on the one or more MIMO communication parameters being met for each target wireless node of the set of target wireless nodes.

12. The method of claim 1, wherein the one or more MIMO communication parameters are applied for single-user MIMO or multi-user MIMO.

13. The method of claim 1, further comprising:
  communicating with one or more target wireless nodes using two or more subsets of antennas to transmit a same data transmission to achieve uniform coverage of the same data transmission.

14. A method for wireless communication at a control entity, comprising:
  transmitting, to at least a first wireless node, an antenna grouping parameter associated with a set of antenna elements of the first wireless node, the antenna grouping parameter for identification of at least a first subset of antenna elements of the set of antenna elements that meet one or more multiple-input multiple-output (MIMO) communication parameters for MIMO communications between the first wireless node and one or more target wireless nodes, or at least one target wireless node that meets the one or more MIMO communication parameters for at least a second subset of antenna elements of the set of antenna elements; and receiving, from the first wireless node, an identification of at least the first subset of antenna elements or the at least one target wireless node.

15. The method of claim 14, wherein the one or more MIMO communication parameters include at least one of a first quantity of singular values of a singular value decomposition of a channel matrix that are within a first range of a largest valued singular value or a value of the first range.

16. The method of claim 15, further comprising:
receiving, from the first wireless node, an indication of at least the first subset of antenna elements that meets the one or more MIMO communication parameter for each of two or more target wireless nodes.

17. The method of claim 14, wherein at least the first subset of antenna elements meet the one or more MIMO communication parameters for two or more target wireless nodes that are located at different distances from the first wireless node.

18. The method of claim 14, further comprising:
receiving, from the first wireless node, an indication of a set of target wireless nodes that meet the one or more MIMO communication parameters for the at least the second subset of antenna elements.

19. The method of claim 14, wherein the antenna grouping parameter further includes a set of target wireless nodes associated with the one or more MIMO communication parameters, and the identification of at least the first subset of antenna elements is based at least in part on the one or more MIMO communication parameters being met for each target wireless node of the set of target wireless nodes.

20. The method of claim 14, wherein the one or more MIMO communication parameters are applied for single-user MIMO or multi-user MIMO.

21. The method of claim 14, further comprising:
scheduling the first wireless node and the one or more target wireless nodes to use two or more subsets of antennas to transmit a same data transmission to achieve uniform coverage of the same data transmission.

22. An apparatus for wireless communication at a first wireless node, comprising:
a processor;
memory coupled with the processor; and
instructions stored in the memory and executable by the processor to cause the apparatus to:
receive, from a control entity, an antenna grouping parameter associated with a set of antenna elements of the first wireless node;
identify, based at least in part on the antenna grouping parameter, at least a first subset of antenna elements of the set of antenna elements that meet one or more multiple-input multiple-output (MIMO) communication parameters for one or more target wireless nodes, or at least one target wireless node that meets the one or more MIMO communication parameters for at least a second subset of antenna elements of the set of antenna elements; and
transmit to the control entity, responsive to receiving the antenna grouping parameter, an indication of at least the first subset of antenna elements or the at least one target wireless node.

23. The apparatus of claim 22, wherein the instructions are further executable by the processor to cause the apparatus to:
determine, for each of two or more subsets of antenna elements, two or more singular values of a singular value decomposition of a channel matrix; and
determine that at least the first subset of antenna elements has a first quantity of singular values that are within a first range of a largest valued singular value, wherein the one or more MIMO communication parameters include at least one of the first quantity of singular values or the first range.

24. The apparatus of claim 23, wherein the instructions are further executable by the processor to cause the apparatus to:
determine a number of subsets of antenna elements that meet the one or more MIMO communication parameters for each of two or more target wireless nodes, and wherein the identification of at least the first subset of antenna elements includes each subset of antenna elements that meet the one or more MIMO communication parameter for each of the two or more target wireless nodes.

25. The apparatus of claim 22, wherein the instructions are further executable by the processor to cause the apparatus to:
communicate with the one or more target wireless nodes using at least the first subset of antenna elements.

26. The apparatus of claim 22, wherein each antenna element of the set of antenna elements is connectable to one or more radio chains, and at least the first subset of antenna elements is determined based at least in part on different combinations of antenna elements that are concurrently usable with different radio chains.

27. An apparatus for wireless communication at a control entity, comprising:
a processor;
memory coupled with the processor; and
instructions stored in the memory and executable by the processor to cause the apparatus to:
transmit, to at least a first wireless node, an antenna grouping parameter associated with a set of antenna elements of the first wireless node, the antenna grouping parameter for identification of at least a first subset of antenna elements of the set of antenna elements that meet one or more multiple-input multiple-output (MIMO) communication parameters for MIMO communications between the first wireless node and one or more target wireless nodes, or at least one target wireless node that meets the one or more MIMO communication parameters for at least a second subset of antenna elements of the set of antenna elements; and
receive, from the first wireless node, an identification of at least the first subset of antenna elements or the at least one target wireless node.

28. The apparatus of claim 27, wherein the one or more MIMO communication parameters include at least one of a first quantity of singular values of a singular value decomposition of a channel matrix that are within a first range of a largest valued singular value or a value of the first range.

29. The apparatus of claim 28, wherein the instructions are further executable by the processor to cause the apparatus to:
receive, from the first wireless node, an indication of at least the first subset of antenna elements that meets the one or more MIMO communication parameter for each of two or more target wireless nodes.

30. The apparatus of claim 27, wherein at least the first subset of antenna elements meet the one or more MIMO communication parameters for two or more target wireless nodes that are located at different distances from the first wireless node.

* * * * *